US009483442B2

(12) United States Patent
Maeda et al.

(10) Patent No.: US 9,483,442 B2
(45) Date of Patent: Nov. 1, 2016

(54) MATRIX OPERATION APPARATUS

(71) Applicant: KABUSHIKI KAISHA TOSHIBA, Tokyo (JP)

(72) Inventors: Seiji Maeda, Kanagawa (JP); Hiroyuki Usui, Pittsburgh, PA (US)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 339 days.

(21) Appl. No.: 14/194,471

(22) Filed: Feb. 28, 2014

(65) Prior Publication Data

US 2015/0081752 A1    Mar. 19, 2015

(30) Foreign Application Priority Data

Sep. 13, 2013    (JP) .................................. 2013-190583

(51) Int. Cl.
*G06F 7/52*    (2006.01)
*G06F 17/16*    (2006.01)

(52) U.S. Cl.
CPC .................................... *G06F 17/16* (2013.01)

(58) Field of Classification Search
CPC ....................................................... G06F 17/16
USPC ................................................. 708/607, 520
See application file for complete search history.

(56) References Cited

U.S. PATENT DOCUMENTS

| 4,575,812 | A | 3/1986 | Kloker et al. |
|---|---|---|---|
| 8,051,124 | B2 | 11/2011 | Salama et al. |
| 8,250,337 | B2 | 8/2012 | Shih |
| 8,300,057 | B2 | 10/2012 | Smith et al. |
| 2014/0365548 | A1* | 12/2014 | Mortensen ............ G06F 9/3001 708/523 |

FOREIGN PATENT DOCUMENTS

| CN | 101432723 | 5/2009 |
|---|---|---|
| DE | 69832985 | 8/2006 |
| EP | 0185025 | 9/1991 |
| EP | 0992885 | 12/2005 |
| IT | 1181661 | 9/1987 |
| JP | H05-055894 | 8/1993 |
| JP | 2000-215028 | 4/2000 |
| JP | 2009-026308 | 2/2009 |
| JP | 2009-530730 | 8/2009 |
| JP | 2009-535721 | 10/2009 |
| JP | 2012-022363 | 2/2012 |
| JP | 5273866 | 8/2013 |
| KR | 101047768 | 7/2011 |
| WO | WO 85/05705 | 12/1985 |
| WO | WO 2007/107795 | 9/2007 |
| WO | WO 2007/127971 | 11/2007 |

OTHER PUBLICATIONS

Kung, H.T., Why Systolic Architectures?. IEEE Computer, vol. 15, Issue 1, pp. 37-46, 1982.

(Continued)

*Primary Examiner* — Tan V. Mai
(74) *Attorney, Agent, or Firm* — Knobbe, Martens, Olson & Bear LLP

(57) ABSTRACT

According to an embodiment, a matrix operation apparatus executing a matrix operation includes multiple nodes, the nodes including: a multiplier configured to perform a first operation for a first input, which is column data and a second input which is row data for the matrix operation and output element components of an operation result of the matrix operation; and an accumulator configured to perform cumulative addition of operation results of the multiplier.

18 Claims, 15 Drawing Sheets

(56) References Cited

OTHER PUBLICATIONS

Navarro, Juan J., et al., Partitioning: An Essential Step in Mapping Algorithms Into Systolic Array Processors. IEEE Computer, vol. 20, Issue 7, pp. 77-89, 1987.

Synder, Lawrence, Introduction to the Configurable, Highly Parallel Computer. IEEE Computer, vol. 15, Issue 1, pp. 47-55, 1982.

Japanese Office Action, Notification of Examiner's Reasons for Rejection, for corresponding Japanese Application No. 2013-190583, mailed Dec. 22, 2015, in 4 pages.

* cited by examiner

MATRIX OPERATION APPARATUS

CROSS-REFERENCE TO RELATED APPLICATION

This application is based upon and claims the benefit of priority from the Japanese Patent Application No. 2013-190583, filed on Sep. 13, 2013, the entire contents of which are incorporated herein by reference.

FIELD

An embodiment described herein relates generally to a matrix operation apparatus.

BACKGROUND

Conventionally, a matrix operation is widely performed in various kinds of processing such as image processing and recognition processing. As apparatuses for performing a matrix operation, there are, for example, a systolic array, a configurable array processor and the like.

The systolic array is a system in which same circuits are regularly arranged so as to perform pipeline processing and parallel processing. The configurable array processor is a processor having multiple nodes and multiple switch units for changing connection among the nodes.

As for the systolic array, however, because the systolic array is configured so that an operation for an input is executed through a predetermined number of cycles and an operation result of each cycle is immediately used in a next cycle as an input, and the operation is repeatedly performed in the whole apparatus, there is a problem that an amount of data transfer until a desired matrix operation result is obtained is large.

As for the configurable array processor, there is a problem that, since a lot of switch circuits for switching a connection state of a wiring network among the nodes are required, circuit scale of the whole apparatus increases.

DETAILED DESCRIPTION

A matrix operation apparatus according to an embodiment is a matrix operation apparatus which executes a matrix operation, the matrix operation apparatus having a first operation unit configured to perform a first operation for a first input which is column data and a second input which is row data for the matrix operation and output element components of an operation result of the matrix operation, and multiple nodes including an accumulator configured to perform cumulative addition of operation results of the first operation unit.

The embodiment will be described below with reference to drawings.

(Configuration of Matrix Operation System)

Figure 1:
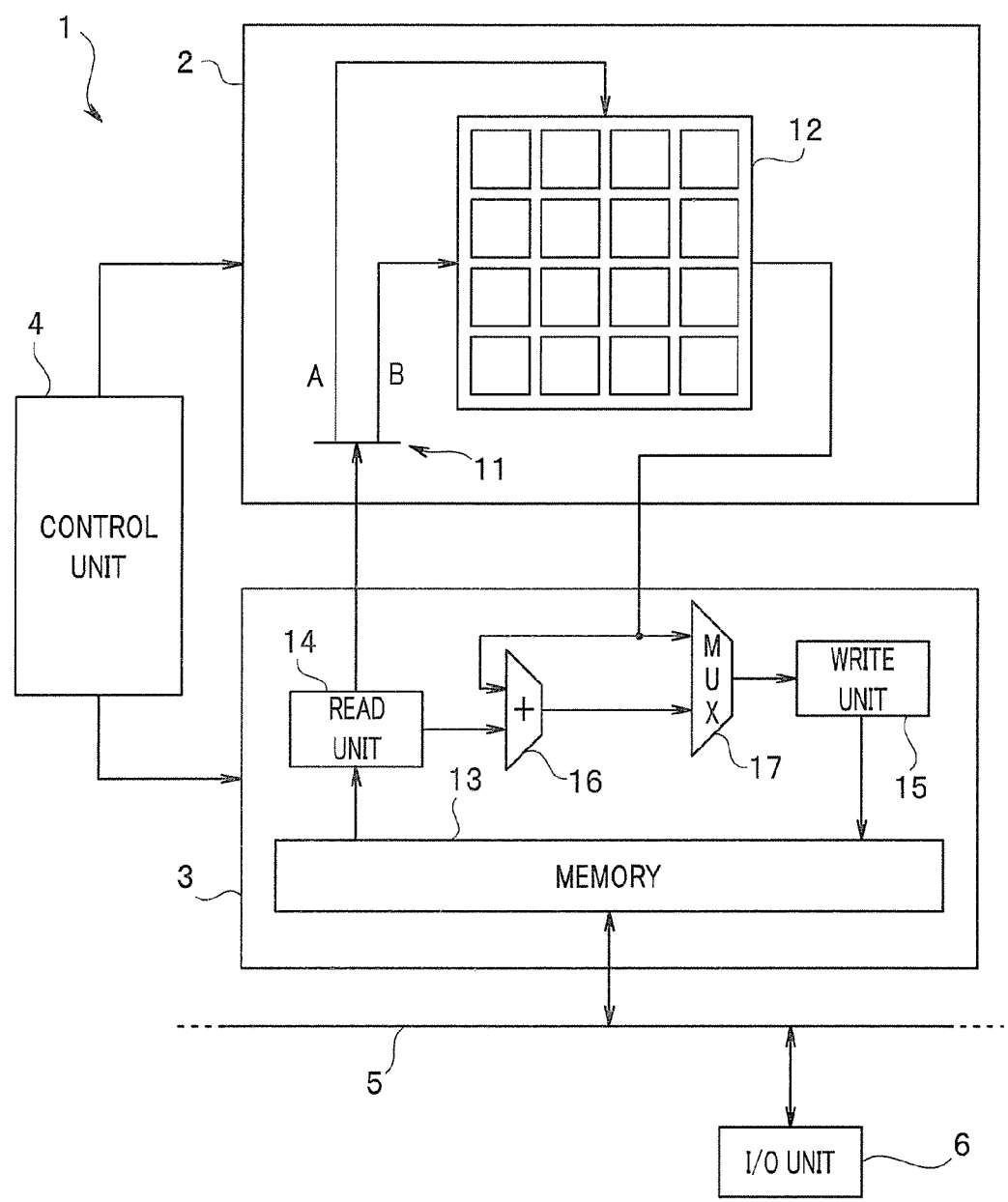
FIG. 1 is a configuration diagram of a matrix operation system according to the present embodiment.

FIG. 1 is a configuration diagram of a matrix operation system according to the present embodiment. A matrix operation system 1 is configured with an array unit 2, a data management unit 3, a control unit 4, an interconnect 5 and an I/O unit 6.

A matrix operation apparatus is configured with the array unit 2 and the data management unit 3 and executes a matrix operation such as a matrix multiplication. The control unit 4 outputs various control signals for performing action control of each circuit in the array unit 2 and the data management unit 3 and data input/output control between the array unit 2 and the data management unit 3.

The array unit 2 includes a data input circuit 11 to which inputs A and B, which are matrix data rows for a matrix operation, are inputted and a matrix operation circuit array (hereinafter referred to an array) 12. The data input circuit 11 receives the inputs A and B from the data management unit 3 to provide the inputs A and B to the array 12. The array 12 is configured with multiple blocks 31 (FIG. 4) arranged in a matrix shape. Each block 31 is configured with a circuit which includes multiple nodes 21 (FIG. 2) arranged in a matrix shape. The array unit 2 outputs an output S, which is an operation result, to the data management unit 3.

The data management unit 3 is configured being provided with a memory 13, a read unit 14, a write unit 15, an operation unit 16 and a multiplexer 17.

The memory 13 is a storage device such as an SRAM in which input data for a matrix operation and output data which is an operation result are stored.

The read unit 14 is a circuit configured to read input data stored in the memory 13 and provides the input data to the data input circuit 11 of the array unit 2.

The write unit 15 is a circuit configured to write an output from the array 12 into the memory 13.

The operation unit 16 is a circuit configured to perform a predetermined operation for an input from the read unit 14 and an output from the array 12, and it has at least an addition function. Here, the operation unit 16 adds the input data from the read unit 14 and the output data from the array 12 to each other and outputs the result. Note that the operation unit 16 may be provided with a subtraction function and a multiplication/division function in addition to the addition function. That is, the operation unit 16 performs a predetermined operation for column data and row data for a matrix operation and outputs from the multiple blocks 31.

The multiplexer 17 is a circuit configured to input an output of the operation unit 16 and an output of the array 12, and select and output any of them. That is, the multiplexer 17 is a selection circuit configured to select and output any of an output of the array 12 including the multiple blocks 31 and an output of the operation unit 16.

Whether the multiplexer 17 is to select and output the output of the array 12 or to select and output the output of the operation unit 16 is determined according to content of an operation of the matrix operation apparatus. Therefore, which of the outputs of the array 12 and the operation unit 16 the multiplexer 17 is to select is set by the control unit 4. That is, the control unit 4 outputs a selection signal controlling selection of the multiplexer 17.

Thus, since the operation unit 16 and the multiplexer 17 are provided for the data management unit 3 in the matrix operation system 1, it is possible to perform various operations, such as addition, for a matrix operation result.

The control unit 4 is a circuit configured to control an action of each circuit in the array unit 2 and the data management unit 3. For example, the control unit 4 outputs various control signals for controlling actions such as holding of data in a register in the array unit 2, switching of an input of a multiplexer, reading out of data by the read unit 14 in the data management unit 3, writing in of data by the write unit 15 and switching of an input of the multiplexer 17, and various setting signals.

The interconnect 5 is a mutual connection network, such as a bus, which connects the data management unit 3 and the I/O unit 6 with each other.

The I/O unit 6 is a circuit configured to receive input data from an outside and outputs the input data to the data management unit 3 via the interconnect 5 as well as outputting output data, which is an operation result, to the outside.

Therefore, in the matrix operation system 1, the data management unit 3 receives matrix operation target data from the outside, the array unit 2 executes a matrix operation under the control of the control unit 4, and the data management unit 3 transmits matrix operation result data to the outside. Each component of the matrix operation system 1 is formed on a semiconductor chip.

(Configuration of Node)

Figure 2:
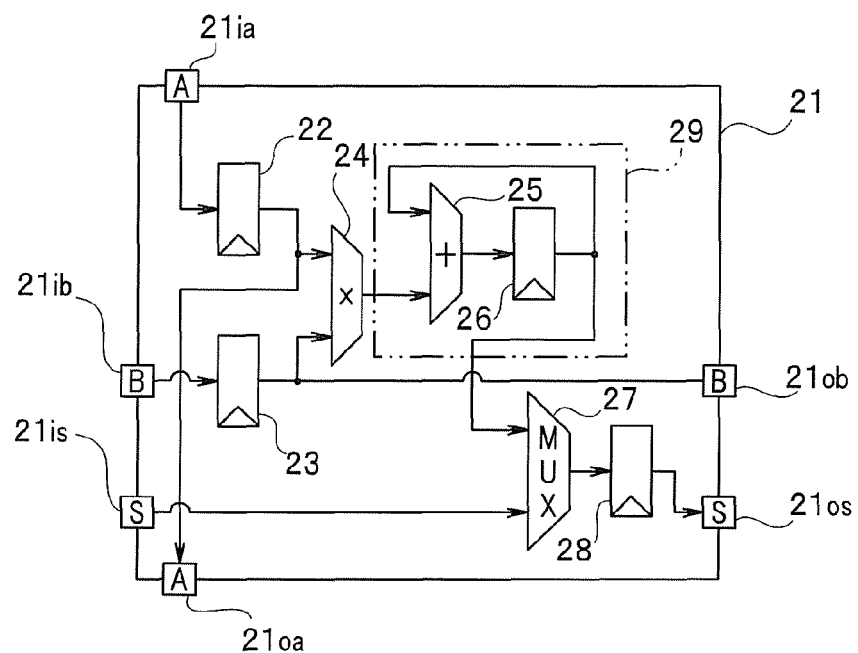
FIG. 2 is a circuit diagram showing a configuration of a node according to the present embodiment.

FIG. 2 is a circuit diagram showing a configuration of a node. The node 21 is configured with registers 22 and 23, a multiplier 24 as an operation unit, an adder 25, a register 26, a multiplexer 27 and a register 28. The node 21 has three input terminals 21ia, 21ib and 21is and three output terminals 21oa, 21ob and 21os.

The input terminal 21ia is a terminal to which A series input data of a matrix operation (for example, vertical-direction input data rows of a matrix) is inputted. The input terminal 21ib is a terminal to which B series input data of the matrix operation (for example, horizontal-direction input data rows of the matrix) is inputted. The input terminal 21is is a terminal to which element component data of an operation result of the matrix (for example, horizontal-direction data rows of an operation result) is inputted.

The input terminal 21ia is connected to an input of the register 22; the input terminal 21ib is connected to an input of the register 23; and the input terminal 21is is connected to one of two inputs of the multiplexer 27.

An output of the register 22 is connected to one of two inputs of the multiplier 24 and the output terminal 21oa. An output of the register 23 is connected to the other of the two inputs of the multiplier 24 and the output terminal 21ob. An output of the multiplier 24 is connected to one of two inputs of the adder 25.

An output of the adder 25 is connected to an input of the register 26. An output of the register 26 is connected to the other of the two inputs of the adder 25 and the other of the two inputs of the multiplexer 27. An accumulator 29 is configured with the adder 25 and the register 26. Execution of a cumulative addition operation of the accumulator 29 is controlled by the control unit 4. That is, each node 21 performs a predetermined operation for an input of column data and an input of row data for a matrix operation. Each node 21 has the multiplier 24, which is an operation unit configured to output element components of a matrix operation result, and the accumulator 29 configured to perform cumulative addition of operation results of the multiplier 24.

An output of the multiplexer 27 is connected to an input of the register 28. An output of the register 28 is connected to the output terminal 21os.

The node 21 is configured such that inputs A, B and S, which are data rows, can be inputted to the three input terminals 21ia, 21ib and 21is, respectively. The input A is held in the register 22, and an output of the register 22 is outputted to the output terminal 21oa as an output A. The input B is held in the register 23, and an output of the register 23 is outputted to the output terminal 21ob as an output B.

That is, each node 21 has the input terminal 21ia which inputs column data of one of two matrices targeted by a matrix operation, the input terminal 21ib which inputs row data of the other of the two matrices, the output terminal 21oa which outputs the inputted column data and the output terminal 21ob which outputs the inputted row data.

Furthermore, each node 21 has the output terminal 21os which outputs a cumulative addition result of the accumulator 29, and a subsequent-stage node has the input terminal 21is for receiving an operation result of a prior-stage node. The subsequent node selects and outputs any of the input of the input terminal 21is and the cumulative addition result of the accumulator 29.

An output of the adder 25, which is an operation unit, is held in the register 26. The node 21 is configured so that any of values of an input S and the register 26 is selected by the multiplexer 27 and held in the register 28, and an output of the register 28 is outputted to the output terminal 21os as the output S.

Which of the two inputs the multiplexer 27, which is a selection circuit, is to select and output is set according to a setting signal from the control unit 4. That is, the control unit 4 outputs a selection signal controlling selection of the multiplexer 27, which is a selection circuit.

Outputs of the register 22 and the register 23 are operated by the multiplier 24, which is an operation unit. Note that the operation unit of the node 21 is provided with at least a multiplication function and may be additionally provided with other operation functions such as addition/subtraction and division.

An operation of adding an output of the multiplier 24 and an output of the register 26 to each other is performed by the adder 25, which is an operation unit. Note that the operation unit of the accumulator 29 is provided with at least an addition function and may be additionally provided with other operation functions such as subtraction and multiplication/division.

The nodes 21 are an operation kernel of each block of the matrix operation apparatus and is configured to be capable of inputting the inputs A, B and S, performing a predetermined operation for the inputs A and B, and outputting the input A, the input B, and the input S or a cumulative value of operation results as the output A, the output B and the output S, respectively.

Figure 3:
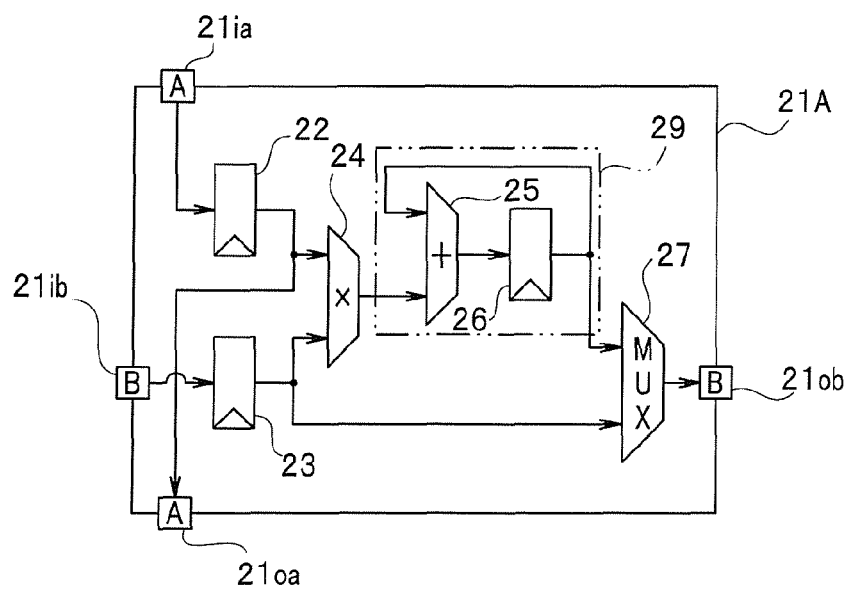
FIG. 3 is a circuit diagram showing a configuration of another node having a configuration different from the configuration in FIG. 2, according to the present embodiment.

Note that the node 21 may have a configuration of another node having a configuration different from the configuration in FIG. 2. FIG. 3 is a circuit diagram showing another node having a configuration different from the configuration of FIG. 2. Note that, in FIG. 3, the same components as shown in FIG. 2 are given the same reference numerals. Description thereof will be omitted, and different components will be described.

A node 21A shown in FIG. 3 is configured with registers 22 and 23, a multiplier 24 as an operation unit, an adder 25, a register 26 and a multiplexer 27. The node 21A has two input terminals 21ia and 21ib and two output terminals 21oa and 21ob.

An output of the register 26 is connected to one of two inputs of the multiplexer 27, and an output of the register 23 is connected to the other of the two inputs of the multiplexer 27.

An output of the multiplexer 27 is connected to the output terminal 21ob. Therefore, any of the output of the register 23 and the output of the register 26 is selected and outputted to the output terminal 21ob by the multiplexer 27.

In the configuration of FIG. 3 also, the operation unit of the node 21 is provided with at least a multiplication function and may be additionally provided with other operation functions such as addition/subtraction and division. In the configuration of FIG. 3 also, the operation unit may be provided with at least an addition function and may be additionally provided with other operation functions such as subtraction and multiplication/division.

In the node 21A in FIG. 3, the inputs B and S and the outputs B and S of the node 21 are shown as a common input and a common output, and the register 28 is omitted. Since an action of the node 21A is equivalent to the action of the node 21 in which the input B and the output B are used instead of using the input S and the output S, a matrix operation apparatus of the present embodiment will be described below with the use of the configuration of the node 21.

(Configuration of Block)

A block 31 is formed by using the multiple nodes 21 described above. The block 31 is configured by the multiple (here, 4×4=16) nodes 21 which are arranged in a matrix shape and connected with one another.

Figure 4:
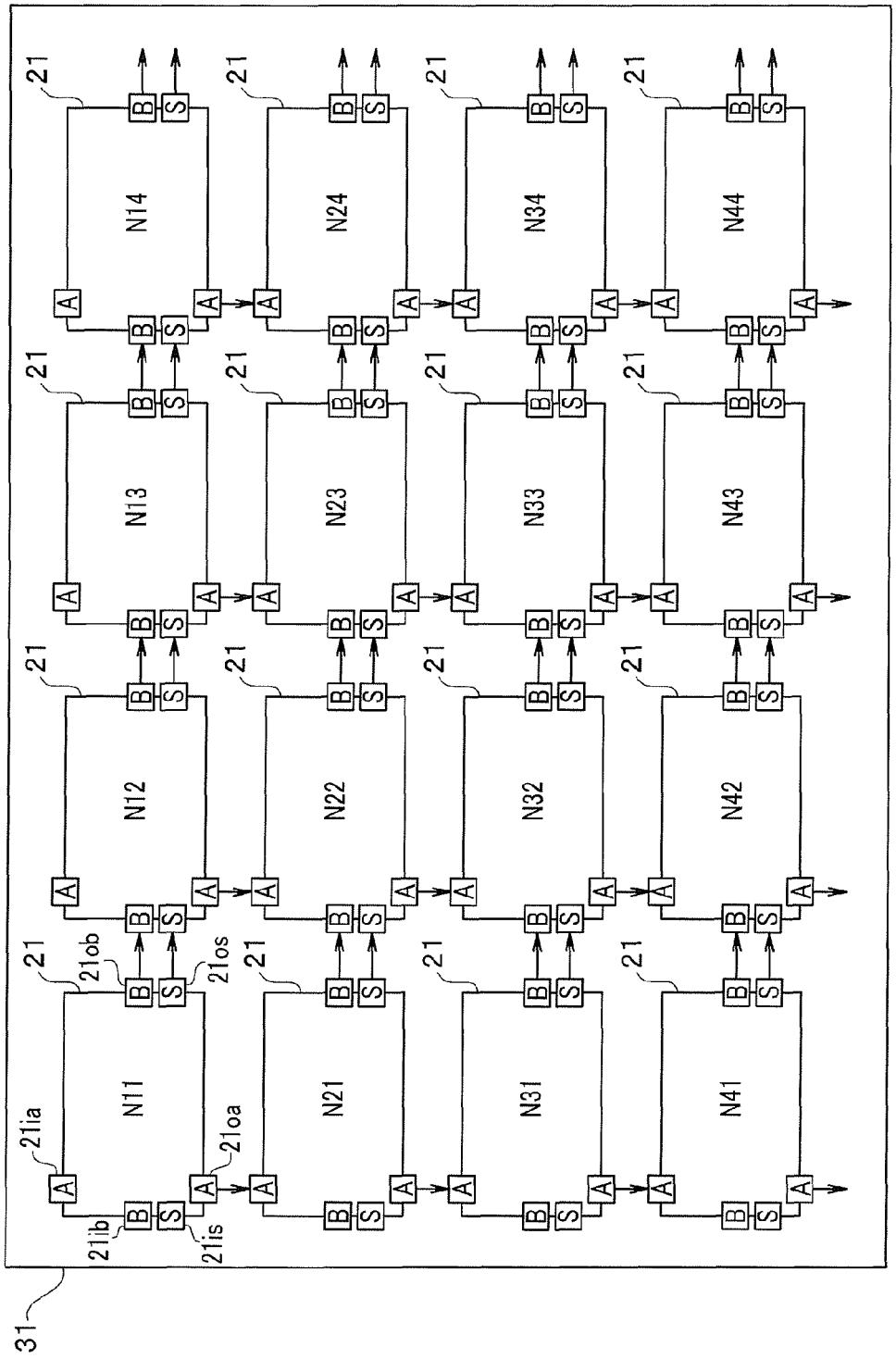
FIG. 4 is a block diagram showing a configuration of a block 31 according to the present embodiment.

FIG. 4 is a block diagram showing a configuration of the block 31. The block 31 is configured by the multiple nodes 21 which are connected in a row direction (horizontal direction) and a column direction (vertical direction). Here, the block 31 is a unit block which includes sixteen nodes and performs a 4×4 matrix operation.

In FIG. 4, multiple (here, four) inputs A of multiple (here, four) nodes 21 at an upper end of the block 31 are a group of inputs A of the block 31; and multiple (here, four) inputs B and multiple inputs S of multiple (here, four) nodes 21 at a left end of the block 31 are a group of inputs B and a group of inputs S of the block 31, respectively. That is, inputs A of a group of upper-end nodes N11, N12, N13 and N14 are the group of inputs A of the block 31, and inputs B and inputs S of a group of left-end nodes N11, N21, N31 and N41 are the group of inputs B and group of inputs S of the block 31, respectively.

Multiple (here, four) outputs A of multiple (here, four) nodes 21 at a lower end of the block 31 are a group of outputs A of the block 31; and multiple (here, four) outputs B and outputs S of multiple (here, four) nodes 21 at a right end of the block 31 are a group of outputs B and a group of outputs S of the block 31, respectively. That is, outputs A of a group of lower-end nodes N41, N42, N43 and N44 are the group of outputs A of the block 31, and outputs B and outputs S of a group of right-end nodes N14, N24, N34 and N44 are the group of outputs B and group of outputs S of the block 31, respectively.

Inside the block 31, in the row direction (that is, in the horizontal direction), the output B and output S of each node 21 are connected to the input B and input S of a node 21 adjoining in a horizontally right direction, respectively. In the vertical direction (that is, in the column direction), the output A of each node is connected to an input A of a node 21 adjoining in a vertically downward direction.

As described above, the block 31 is configured by connecting the multiple (here, 4×4=16) nodes 21 and connecting input data A, B and S and output data A, B and S in the row direction and the column direction among the nodes 21.

(Configuration of Array)

The multiple blocks 31 described above are used to form the array 12 of the matrix operation system 1. The array 12 is configured to include multiple (here, 4×4=16) blocks 31 connected in the row direction (horizontal direction) and the column direction (vertical direction).

Figure 5:
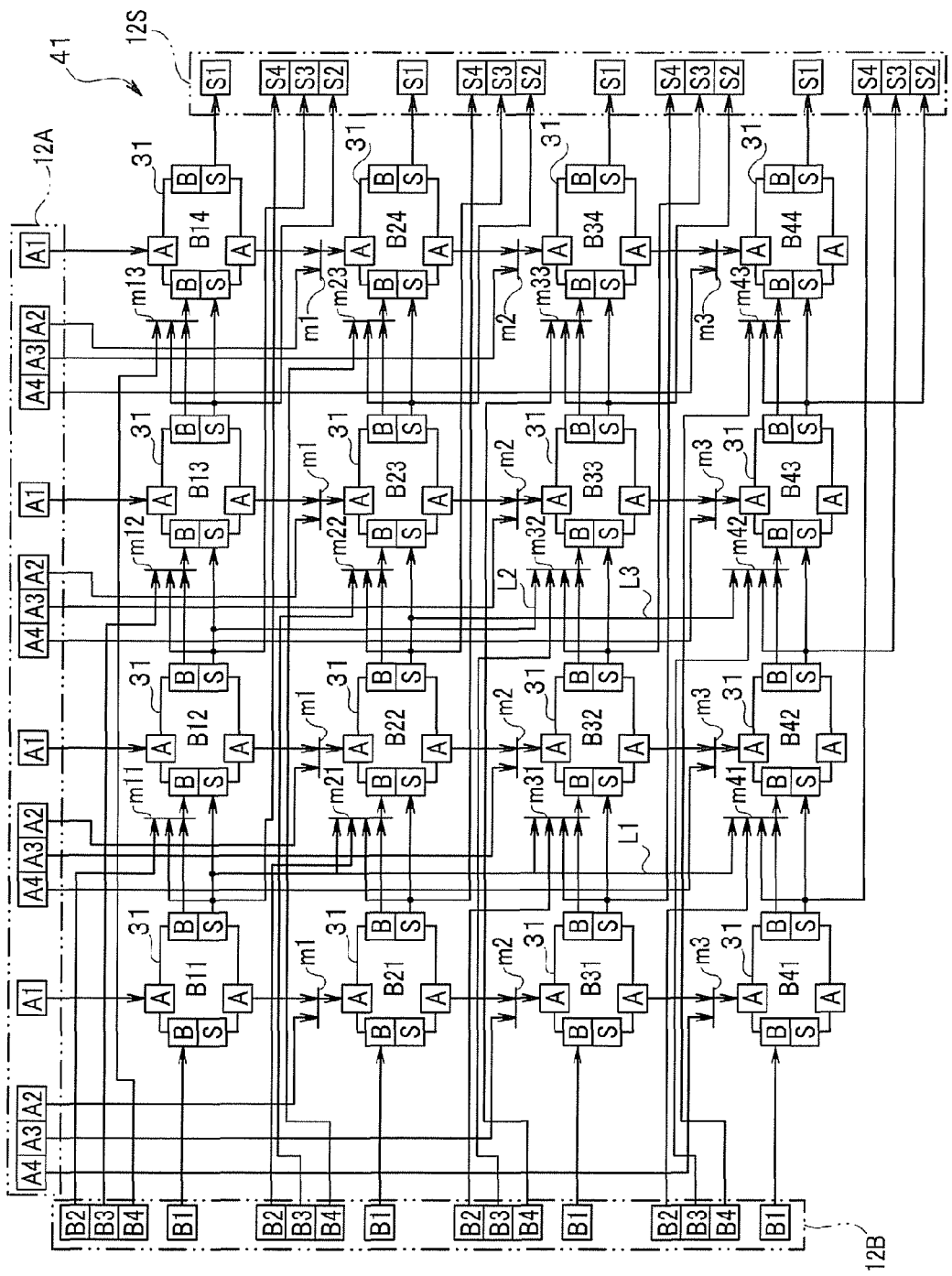
FIG. 5 is a block diagram showing a configuration of an array 12 according to the present embodiment.

FIG. 5 is a block diagram showing a configuration of the array 12. The array 12 is configured to include multiple (here, sixteen) blocks 31 connected in a matrix shape in the row direction and the column direction.

The array 12 in FIG. 5 is provided with an input unit 12A for groups of vertical-direction inputs A1, A2, A3 and A4, an input unit 12B for groups of horizontal-direction inputs B1, B2, B3 and B4, and an output unit 12S for groups of horizontal-direction outputs S1, S2, S3 and S4.

Input data of the groups of the inputs A1, A2, A3 and A4 and the groups of the inputs B1, B2, B3 and B4 is provided from the data management unit 3 to the array 12 via the data input circuit 11 under the control of the control unit 4.

The inputs A1 to multiple blocks (here, four blocks B11, B12, B13 and B14) of multiple (here, four) blocks 31 at an upper end of the array 12 are a first group of vertical inputs of the array 12, and the inputs B1 to multiple blocks (here, four blocks B11, B21, B31 and B41) of the multiple (here, four) blocks 31 at a left end of the array 12 are a first group of horizontal inputs of the array 12. That is, the multiple inputs A1 of the group of upper-end blocks 31 are the first group of vertical inputs A1 of the array 12, and the multiple inputs B1 of the group of left-end blocks 31 are the first group of horizontal inputs B1 of the array 12.

The outputs S1 of multiple blocks (here, four blocks B14, B24, B34 and B44) of multiple (here, four) blocks 31 at a right end of the array 12 are a first group of outputs S1 of the array 12. That is, the multiple outputs S1 of the group of right-end blocks 31 are the first group of outputs S1.

Inside the array 12, in the vertical direction (that is, in the column direction), the output A of each block 31 is connected to an input of a multiplexer connected to the input A of a block 31 adjoining in the vertically downward direction. To the input A of each block 31 in the array 12 except the group of upper-end blocks B11, B12, B13 and B14, one of multiple inputs selected by the multiplexer is inputted.

In the row direction (that is, in the horizontal direction), the output S of each block 31 is connected to the input S of a subsequent-stage block 31 adjoining in the horizontal direction.

Furthermore, each of the outputs S of a group of blocks B13, B23, B33 and B43 on a second column from the right is connected to a second group of outputs S2. Each of the outputs S of a group of blocks B12, B22, B32 and B42 on a second column from the left is connected to a third group of outputs S3, and each of the outputs S of a group of left-end blocks B11, B21, B31 and B41 is connected to a fourth group of outputs S4.

The output B of each block 31 is connected to an input of a multiplexer connected to the input B of a subsequent-stage block 31 adjoining in the horizontal direction. To the input B of each block 31 in the array 12 except the group of left-end blocks B11, B21, B31 and B41, one of multiple inputs selected by the multiplexer is inputted.

More specifically, among the 4×4 blocks in FIG. 5, the input A1 is inputted to each of the inputs A of the upper-end blocks B11, B12, B13 and B14. The input B1 is inputted to each of the inputs B of the left-end blocks B11, B21, B31 and B41.

An output of a multiplexer m1 which selects and outputs any of the output A of each of the blocks B11, B12, B13 and B14 and the input A2 is connected to the inputs A of the blocks B21, B22, B23 and B24 on a second row. An output of a multiplexer m2 which selects and outputs any of the output A of each of the blocks B21, B22, B23 and B24 and the input A3 is connected to the inputs A of blocks B31, B32, B33 and B34 on a third row. An output of a multiplexer m3 which selects and outputs any of the output A of each of the blocks B31, B32, B33 and B34 and the input A4 is connected to the inputs A of lower-end blocks B41, B42, B43 and B44.

To the inputs S of the blocks B12, B22, B32 and B42 on the second column from the left, the outputs S of the left-end blocks B11, B21, B31 and B41, which are prior-stage blocks, are inputted, respectively.

One selected from among multiple inputs is inputted to each of the inputs B of the blocks B12, B22, B32 and B42 on the second column from the left. Therefore, the multiplexers m11, m21, m31 and m41 are connected to the blocks B12, B22, B32 and B42, respectively. Especially, the output S of the block B11 is connected to the multiplexers m21, m31 and m41 via a connection line L1 so that the output S of the block B11 is inputted to the multiplexers m21, m31 and m41.

The input B of the block B12 is connected to an output of the multiplexer m11 which selects and outputs any of the input B1 and the outputs B and S of the block B11. The input B of the block B22 is connected to an output of the multiplexer m21 which selects and outputs any of the input B2, the outputs B and S of the block B21 and the output S of the block B11. The input B of the block B32 is connected to an output of the multiplexer m31 which selects and outputs any of the input B2, the outputs B and S of the block B31 and the output S of the block B11. The input B of the block B42 is connected to an output of the multiplexer m41 which selects and outputs any of the input B2, the outputs B and S of the block B41 and the output S of the block B11.

To the inputs S of the blocks B13, B23, B33 and B43 on the third column from the left, the outputs S of the blocks B12, B22, B32 and B42 on the second column from the left, which are prior-stage blocks, are inputted, respectively.

One selected from among multiple inputs is inputted to each of the inputs B of the blocks B13, B23, B33 and B43 on the third column from the left. Therefore, the input B of the block B13 is connected to an output of a multiplexer m12 which selects and outputs any of the input B3 and the outputs B and S of the block B12. The input B of the block B23 is connected to an output of a multiplexer m22 which selects and outputs any of the input B3 and the outputs B and S of the block B22. The input B of the block B33 is connected to an output of a multiplexer m32 which selects and outputs any of the input B3, the outputs B and S of the block B32 and the output S of the block B12. Therefore, the output S of the block B12 is connected to the multiplexer m32 via a connection line L2.

The input B of the block B43 is connected to an output of a multiplexer m42 which selects and outputs any of the input B3, the outputs B and S of the block B42 and the output S of the block B22. Therefore, the output S of the block B22 is connected to the multiplexer m42 via a connection line L3.

To the inputs S of the right-end blocks B14, B24, B34 and B44, the output S of the B13, B23, B33 and B43 on the third column from the left, which are prior-stage blocks, are inputted, respectively.

One selected from among multiple inputs is inputted to each of the inputs B of the right-end blocks B14, B24, B34 and B44. Therefore, the input B of the block B14 is connected to an output of a multiplexer m13 which selects and outputs any of the input B4 and the outputs B and S of the block B13.

The input B of the block B24 is connected to an output of a multiplexer m23 which selects and outputs any of the input B4 and the outputs B and S of the block B23. The input B of the block B34 is connected to an output of a multiplexer m33 which selects and outputs any of the input B4 and the outputs B and S of the block B33. The input B of the block B44 is connected to an output of a multiplexer m43 which selects and outputs any of the input B4 and the outputs B and S of the block B43.

As described above, a cumulative addition result of prior-stage blocks 31 inputted to the multiplexers m11, m12, m13 and the like, which are selection circuits, is a cumulative addition result of the accumulator 29 of each node 21 included in a prior-stage block or the like on the same row of the matrix.

Furthermore, the cumulative addition result inputted to the multiplexers m21, m31, m41, m32 and m42 includes a cumulative addition result of the accumulator 29 of each node 21 included in a prior-stage block on a different column of the matrix.

Furthermore, in a subsequent-stage block among the multiple blocks 31, row data is inputted to the input terminals 21ib of the multiple nodes 21 via the multiplexers m11, m21, . . . , m43, which are selection circuits for selecting and outputting any of a cumulative addition result of the accumulator 29 of each node 21 included in a prior-stage block and an input from a block other than the prior-stage block.

As described above, the array 12 includes multiple blocks 31, and each block 31 is configured with multiple nodes 21. The block 31 is configured by connecting the multiple nodes 21 (here, 4×4=16) and connecting input data A, B and S and output data A, B and S in the row direction and the column direction among the nodes 21. In the array 12, one selected from among three or four values is inputted to the group of inputs B of each block.

Especially, to the inputs B of the blocks B12, B13 and B14, one selected from among three values (three of the output B of a block 31 adjoining in a horizontally left direction, the output S of the block 31 adjoining in the horizontally left direction, and any one of the inputs B2 to B4 of the array 12).

Furthermore, to each of the inputs B of the blocks B22, B32 and B42, one selected from among four inputs including the output S of the block B11 inputted via the connection line L1 is inputted in addition to the three inputs.

Furthermore, to the input B of the block B33, one selected from among four values including the output S of the block B12 inputted via the connection line L2 is inputted in addition to three values (three of the output B of a block 31 adjoining in the horizontally left direction, the output S of the block 31 adjoining in the horizontally left direction, and the input B3 of the array 12). That is, the output S of the block B12 can be selected as the input B of the block B33.

Furthermore, to the input B of the block B43, one selected from among four values including the group of outputs S of the block B22 inputted via the connection line L3 is inputted in addition to three values (three of the output B of a block 31 adjoining in the horizontally left direction, the output S of the block 31 adjoining in the horizontally left direction, and the input B3 of the array 12). That is, the output S of the block B22 can be selected as the input B of the block B43.

In the row direction (that is, in the horizontal direction), the output S of each block 31 is connected to the input S of a block 31 adjoining in the horizontally right direction.

In the column direction (that is, in the vertical direction), a first group of inputs A1 of the array 12 is inputted to an upper-end group of blocks B11, B12, B13 and B14. In a second-row group of blocks B21, B22, B23 and B24, any of the output A of a block 31 adjoining in a vertically upward direction and the second group of inputs A2 of the array 12 can be selected as the input A of each block 31. In a third-row group of blocks B31, B32, B33 and B34, any of the output A of a block 31 adjoining in the vertically upward direction and a third group of inputs A3 of the array 12 can be selected as the input A of each block 31. In a fourth-row group of blocks B41, B42, B43 and B44, any of the output A of a block 31 adjoining in the vertically upward direction and a fourth group of inputs A4 of the array 12 can be selected as the input A of each block 31.

The array 12 is configured so as to be capable of outputting the first to fourth output groups multiple times.

(Operation)

Next, an action of the matrix operation system 1 will be described.

(Action of Node)

First, an action of the node 21 will be described. The control unit 4 controls each node 21 to initialize the register 26 in each node 21.

Here, a multiplication of a matrix A having 4 rows and 4 columns and a matrix B having 4 rows and 4 columns will be described.

The matrix A is a matrix having element components (hereinafter referred to as elements) of values shown in a following expression (1).

$$A = \begin{pmatrix} a11 & a12 & a13 & a14 \\ a21 & a22 & a23 & a24 \\ a31 & a32 & a33 & a34 \\ a41 & a42 & a43 & a44 \end{pmatrix} \quad (1)$$

The matrix B is a matrix having elements of values shown in a following expression (2).

$$B = \begin{pmatrix} b11 & b12 & b13 & b14 \\ b21 & b22 & b23 & b24 \\ b31 & b32 & b33 & b34 \\ b41 & b42 & b43 & b44 \end{pmatrix} \quad (2)$$

A matrix S is a matrix of matrix multiplications having elements of values shown in a following expression (3).

$$S = \begin{pmatrix} s11 & s12 & s13 & s14 \\ s21 & s22 & s23 & s24 \\ s31 & s32 & s33 & s34 \\ s41 & s42 & s43 & s44 \end{pmatrix} \quad (3)$$

It is assumed that inputs A of a data row of a first column (a11 to a41) of the matrix A are sequentially inputted to the input A of the node 21 shown in FIG. 2, and inputs B of a data row of a first row of the matrix B are sequentially inputted to the input B of the node 21.

When the value a11 is inputted to the input A, and the value b11 is inputted to the input B, the value a11 is held in the register 22, and the value b11 is held in the register 23. The values a11 and b11 are multiplied by the multiplier 24. The multiplication value (a11*b11), which is an output of the multiplier 24, is added to "0" by the adder 25 and held in the register 26 as an addition value which is an output of the adder 25.

Next, the value a11 is outputted to the output A, and the value b11 is outputted to the output B. At the same time, when the value a21 is inputted to the input A, and the value b12 is inputted to the input B, the value a21 is held in the register 22, and the value b12 is held in the register 23. The values a21 and b12 are multiplied by the multiplier 24. An internal state of the node 21 is shown in FIG. 6.

Figure 6:
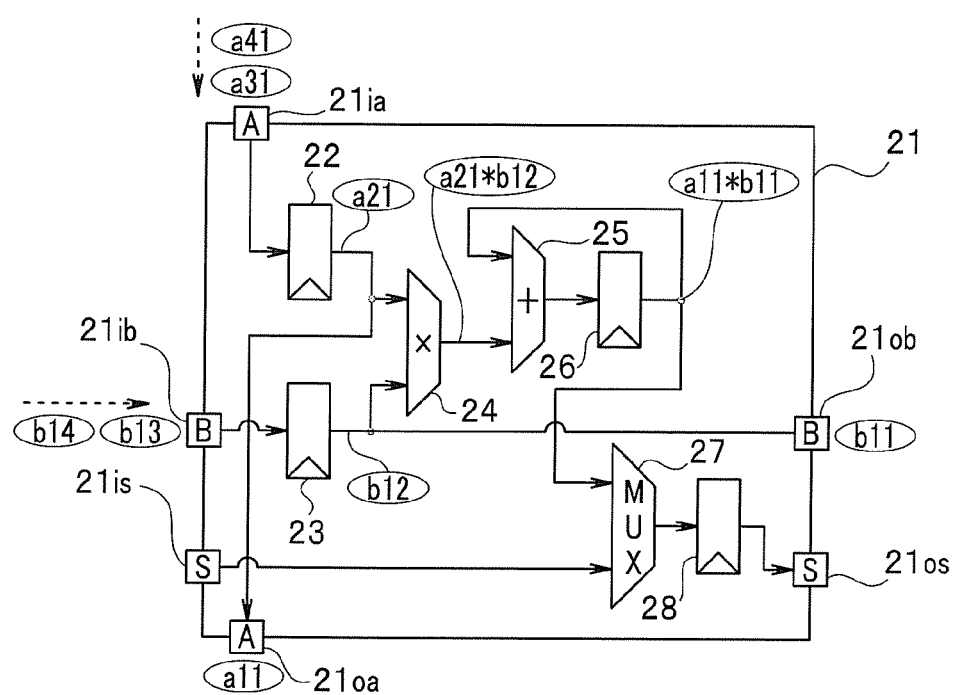
FIG. 6 is a diagram for illustrating an action state of a node 21, according to the present embodiment.

FIG. 6 is a diagram for illustrating an action state of the node 21. The multiplication value (a21*b12), which is an output of the multiplier 24, is added to the value "a11*b11" by the adder 25 and held in the register 26 as an addition value which is an output of the adder 25.

After that, similarly, inputs a31 and a41 and inputs b13 and b14 are inputted to the input A and the input B, respectively, and a value (a11*b11+a21*b12+a31*b13+a41*b14) is held in the register 26. This value (a11*b11+a21*b12+a31*b13+a41*b14) is a result of a dot product of the first column of the matrix A and the first row of the matrix B.

The value of the dot product is inputted to one of two inputs of the multiplexer 27. The value can be held in the register 28 and outputted from the register 28 under the control of the control unit 4. As a result, the value of the dot product can be outputted from the output S of the node 21.

As described above, in each node 21, a dot product of a multiplication of the 4×4 matrix A and the 4×4 matrix B can be operated. Note that it goes without saying that, though each node 21 is a node capable of operating a 4×4 matrix multiplication here, the node may be a node capable of operating a matrix multiplication with any size.

(Action of Block)

Next, an action of the block 31 will be described. The control unit 4 controls data input/output timing of each node 21.

Figure 7:
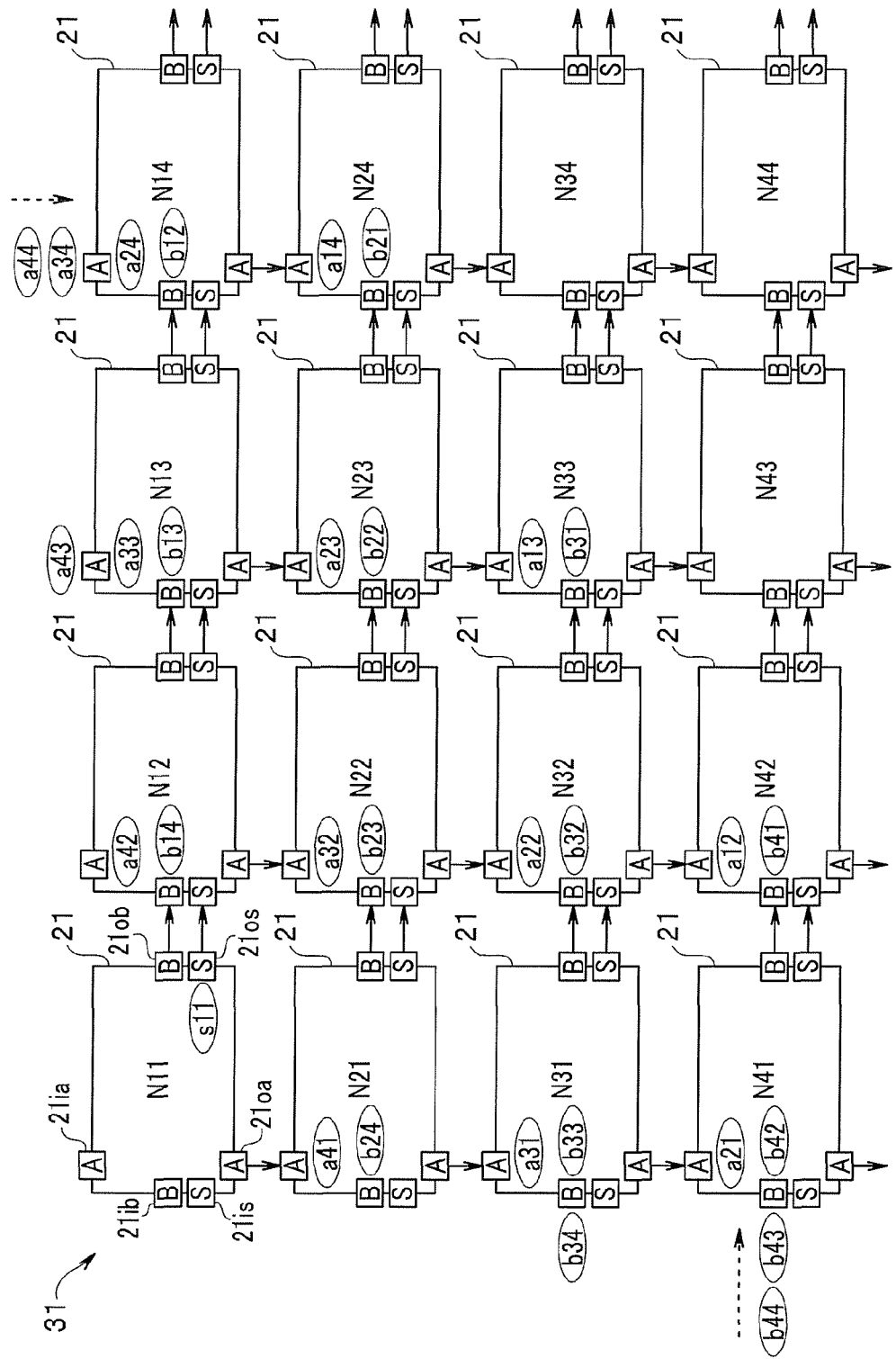
FIG. 7 is a diagram for illustrating an operation of a matrix multiplication B A of a matrix B and a matrix A, and an output of a matrix S which is a result of the operation, according to the present embodiment.

FIG. 7 is a diagram for illustrating an operation of a matrix multiplication B×A of the matrix B and the matrix A, and an output of the matrix S which is a result of the operation.

The block 31 is configured so that respective columns of the matrix A can be sequentially inputted from an upper-side node row as the group of inputs A. Furthermore, each element of each column of the matrix A is inputted one cycle later than the upper-side node row.

The block 31 is configured so that respective rows of the matrix B can be sequentially inputted from a left-side node column as the group of inputs B. Furthermore, each element of each row of the matrix B is inputted one cycle later than the left-side node column.

Thus, when the group of inputs A and the group of inputs B are sequentially inputted, respective elements of a matrix multiplication of the matrix A and the matrix B are sequentially held in the register 26 of each node 21. For example, in FIG. 7, a11, a21, a31 and a41 are sequentially inputted to the upper-left node N11 from the inputs A for an operation of the matrix multiplication B×A. Since b11, b12, b13 and b14 are sequentially inputted from the inputs B, b11×a11+b12×a21+b13×a31+b14×a41, that is, an element s11 of the matrix S which is an operation result of the matrix multiplication is held in the register 26.

Similarly, a11, a21, a31 and a41 are sequentially inputted to the node 21 from inputs. Since b21, b22, b23 and b24 are sequentially inputted from the inputs B, s21 (=b21×a11+b22×a21+b23×a31+b24×a41) of the matrix S is held. Similarly, s12 (=b12×a12+b12×a22+b13×a32+b14×a42) of the matrix S is held in the node 21. FIG. 7 shows an action state when the element s11 of the matrix S is generated and held in the node N11.

Figure 8:
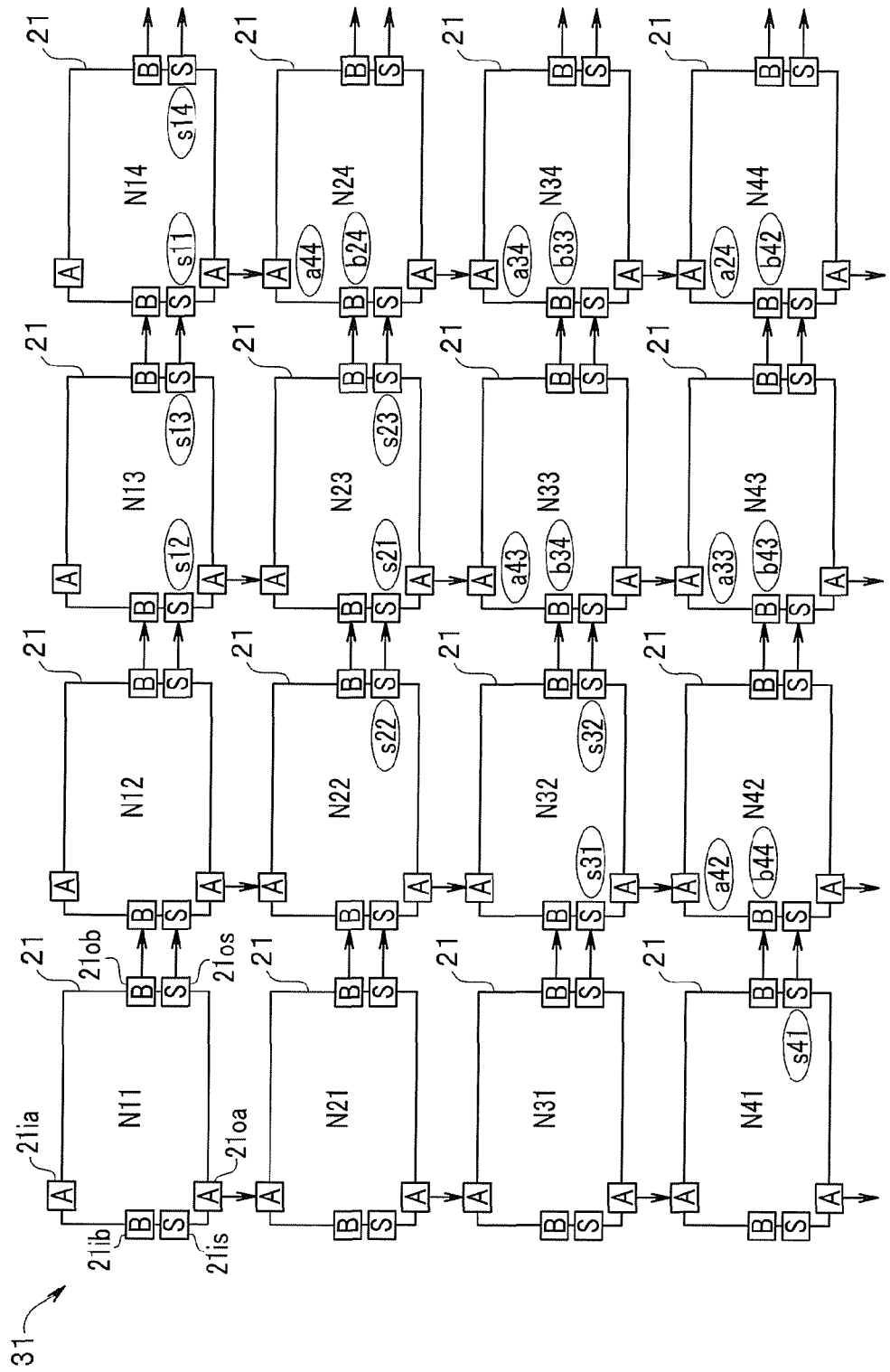
FIG. 8 is a diagram for illustrating a state three clocks after an action state shown in FIG. 7.

FIG. 8 is a diagram for illustrating a state three clocks after the action state shown in FIG. 7. Respective elements of the matrix S calculated in each node 21 are sequentially outputted in a right direction of a node row via the outputs S of each node 21. In each node 21, if the node 21 has both of each element of the matrix S inputted from the input S and each element of the matrix S operated by the node itself, each multiplexer 27 is controlled by the control unit 4 so as to select each element of the matrix S inputted from the input S and output the element to the output S.

Figure 9:
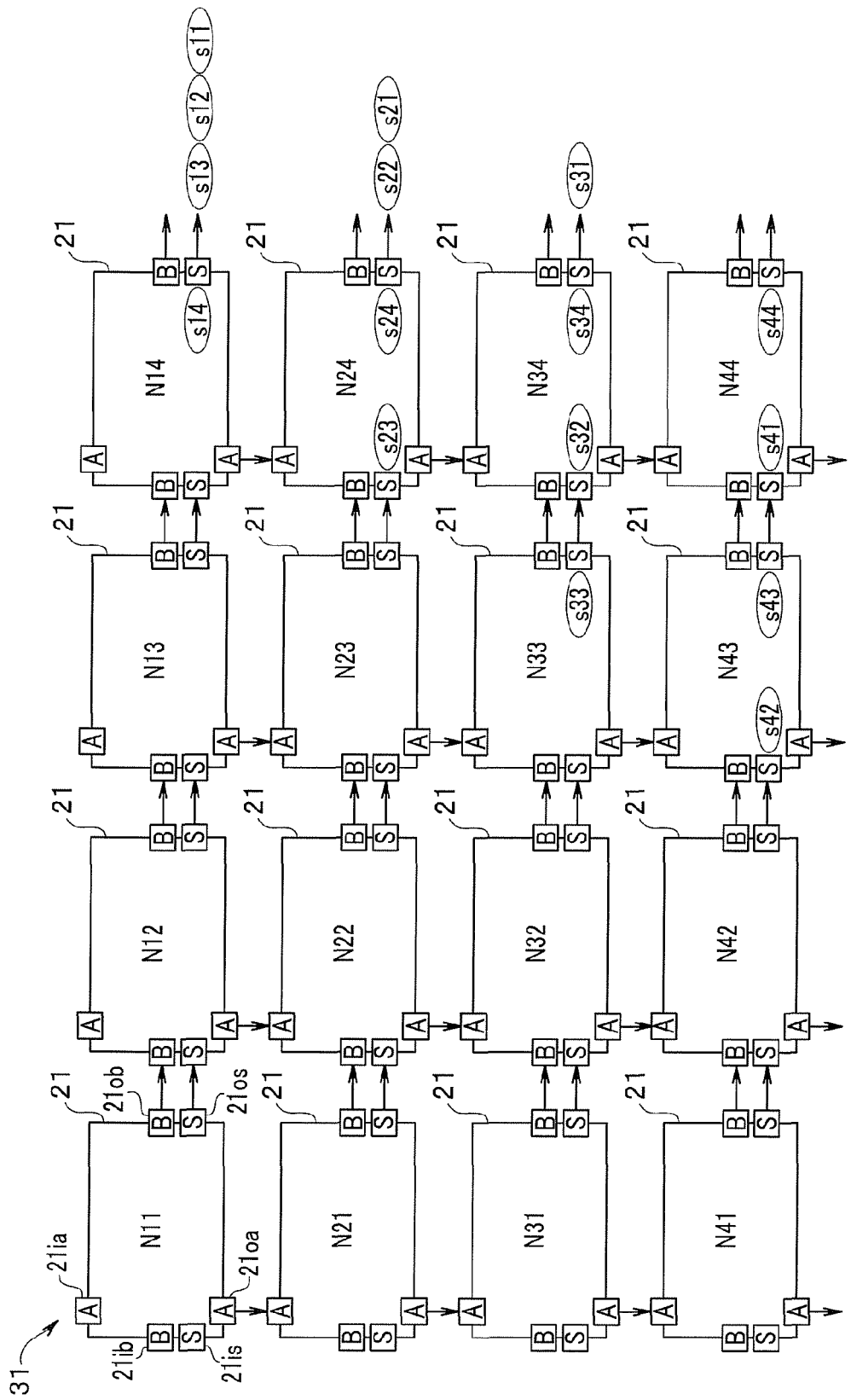
FIG. 9 is a diagram for illustrating a state three clocks after the action state shown in FIG. 8.

FIG. 9 is a diagram for illustrating a state three clocks after the action state shown in FIG. 8. Respective elements of the matrix S are sequentially outputted from the group of outputs S of the block 31, with a left-side element earlier.
(Action of Array)

Next, an action of the array 12 will be described.
(Case of Operation of 16×16 Matrix Multiplication)

First, a case of operating a 16×16 matrix multiplication using the array 12 will be described.

Figure 10:
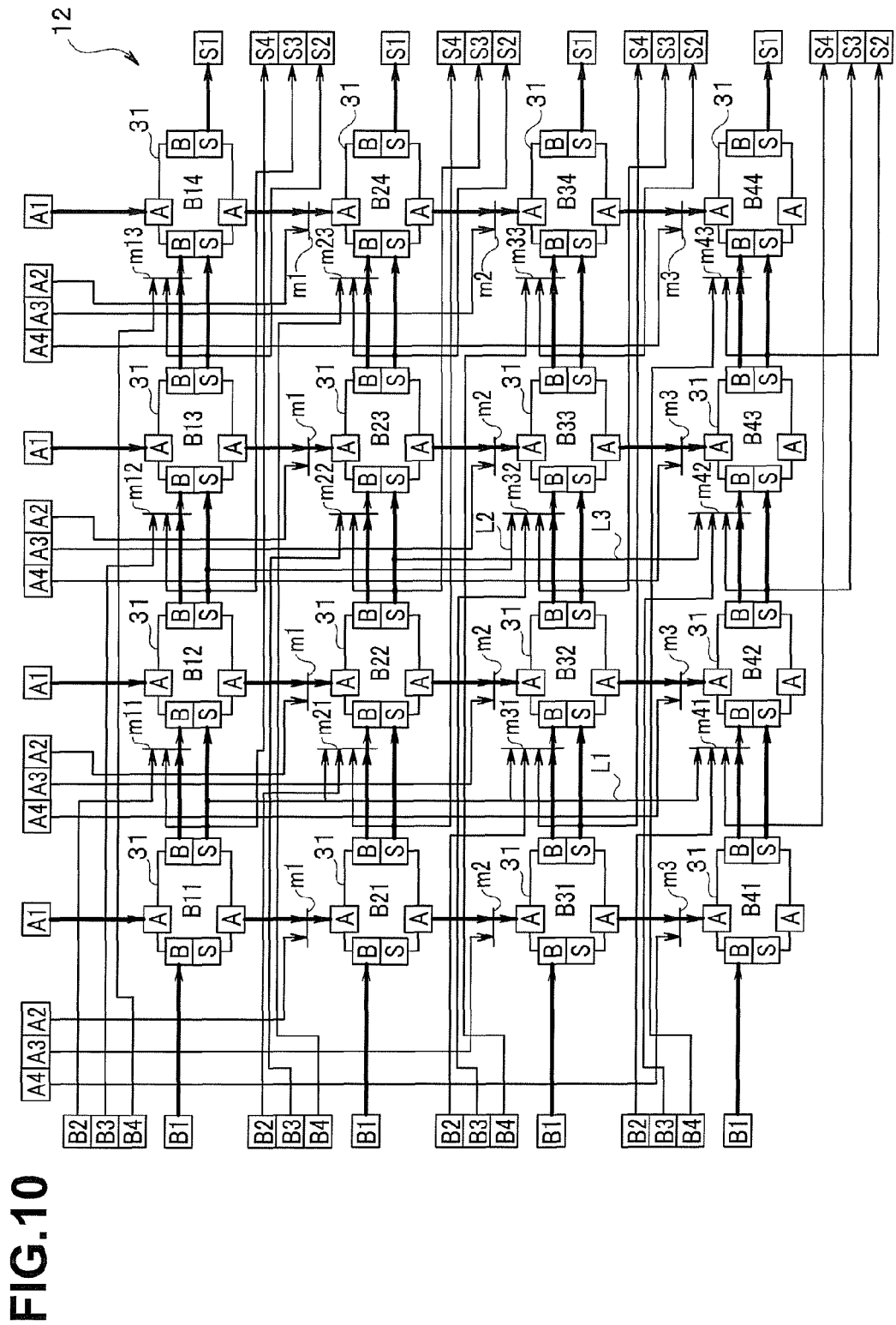
FIG. 10 is a diagram for illustrating a case of performing an operation of a 16×16 matrix multiplication according to the present embodiment.

FIG. 10 is a diagram for illustrating the case of performing a 16×16 matrix multiplication operation. More specifically, FIG. 10 is a diagram for illustrating a case of operating a matrix multiplication B×A of a matrix B having 16 rows and n columns (n is a positive integer) and a matrix A having n rows and 16 columns using the array 12 to acquire an operation result matrix S. In FIG. 10, the control unit 4 performs setting for selection of input data to be outputted by the respective multiplexers m1 to m3, and m11 to m43 so that inputs or outputs indicated by thick lines are selected.

In the blocks B21 to B24, the blocks B31 to B34 and the blocks B41 to B44, the group of outputs A of an upper adjoining block 31 is selected as the group of inputs A. For example, the group of outputs A of the block B11 is selected as the group of inputs A of the block B21.

The group of outputs B of a left adjoining block 31 is selected as the group of inputs B of the blocks B12 to B14, the blocks B22 to B24, the blocks B32 to B34 and the blocks B42 to B44. The group of outputs S of a left adjoining block 31 is inputted as the group of inputs S of the blocks B12 to B14, the blocks B22 to B24, the blocks B32 to B34 and the blocks B42 to B44. Therefore, for example, the group of outputs B and group of outputs S of the block B 11 are inputted to the group of inputs B and group of inputs S of the block B12.

When the array 12 is configured as described above, and respective columns of the matrix A and respective rows of the matrix B are sequentially inputted to the group of inputs A1 and the group of inputs B1, respectively, respective rows of the matrix S are sequentially outputted to the group of outputs S.

Note that, since respective elements of the matrix S are outputted from the group of outputs S of each block 31, the respective elements of the matrix S may be acquired from the groups of outputs S1 to S3.
(Case of Four Parallel Operations of 8×8 Matrix Multiplications)

Next, a case of operating four 8×8 matrix multiplications in parallel using the array 12 will be described.

Figure 11:
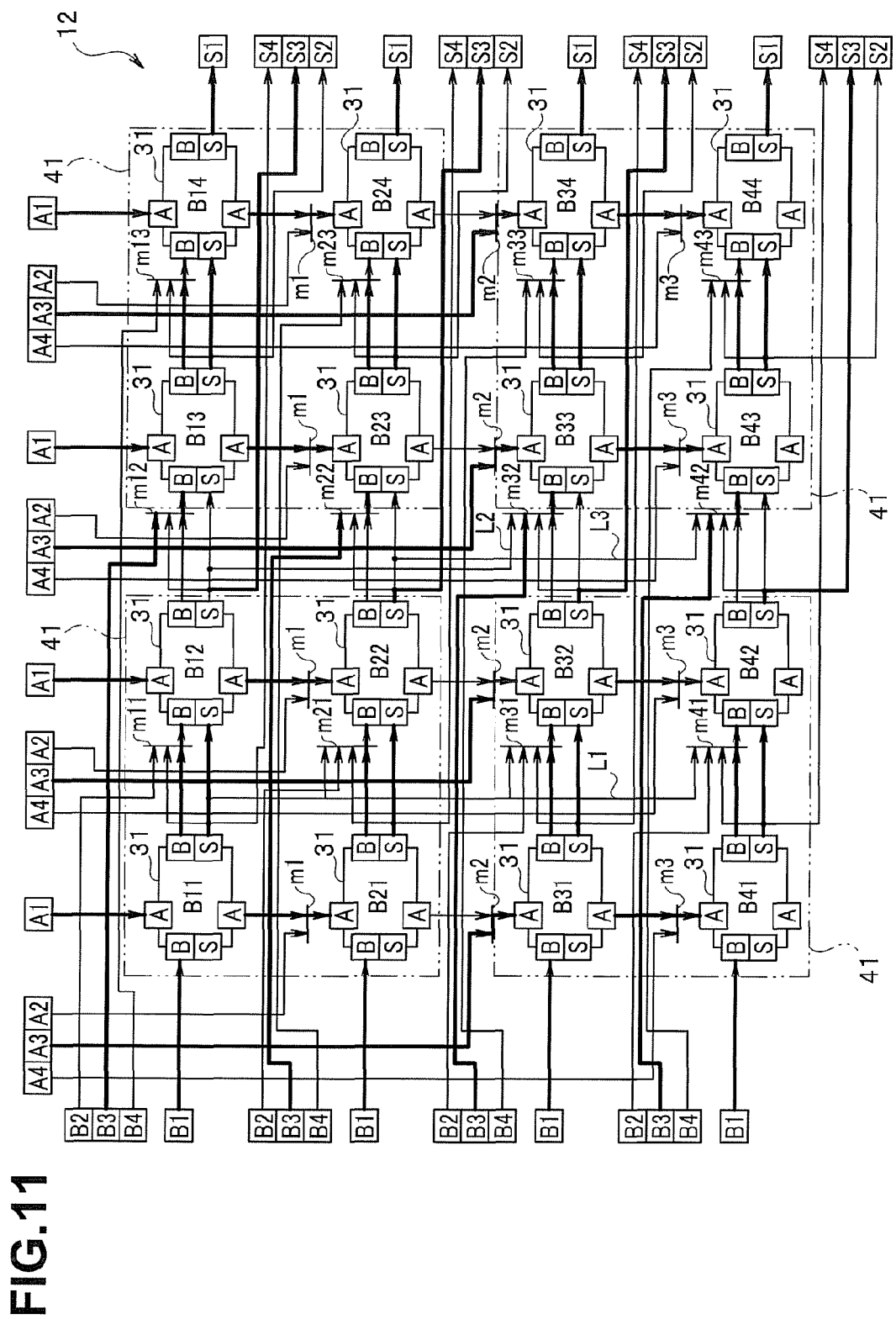
FIG. 11 is a diagram for illustrating a case of performing four parallel operations of 8×8 matrix multiplications according to the present embodiment.

FIG. 11 is a diagram for illustrating a case of performing four parallel operations of 8×8 matrix multiplications. More specifically, FIG. 11 is a diagram for illustrating a case of operating four kinds of matrix multiplications B×A of matrices B1 to B4 having 8 rows and n columns (n is a positive integer) and matrices A1 to A4 having n rows and 8 columns using the array 12 at the same time to acquire four matrices S1 to S4, which are operation results. In FIG. 11, the control unit 4 performs setting for selection of input data to be outputted by the respective multiplexers m1 to m3, and m11 to m43 so that inputs or outputs indicated by thick lines are selected.

In the blocks B21 to B24 and the blocks B41 to B44, the group of outputs A of an upper adjoining block is selected as the group of inputs A. For example, the group of outputs A of the block B11 is inputted to the group of inputs A of the block B21.

In the blocks B31 to B34, the group of inputs A3 of the array 12 is selected as the group of inputs A.

In the blocks B12 and B14, the blocks B22 and B24, the blocks B32 and B34 and the blocks B42 and B44, the group of outputs B and group of outputs S of a left adjoining block are selected as the group of inputs B and the group of inputs S, respectively. For example, the group of outputs B and group of outputs S of the block B11 are inputted to the group of inputs B and group of inputs S of the block B12, respectively.

In the blocks B13, the block B23, the block B33 and the block B43, the group of outputs B3 of the array 12 is inputted as the group of inputs B.

When the array 12 is configured as described above, and respective columns of the matrices A1 and A2, respective columns of the matrices A3 and A4, respective rows of the matrices B1 and B2, and respective rows of the matrices B3 and B4 are sequentially inputted to the group of inputs A1, the group of inputs A3, the group of inputs B1 and the group of inputs B3, respectively, respective rows of the matrices S1 and S2 and respective rows of the matrices S3 and S4 are sequentially outputted to the group of outputs S3 and the group of outputs S1, respectively.

That is, in FIG. 11, each of four block groups 41 indicated by two-dot chain lines performs an 8×8 matrix operation, and the array 12 can execute four parallel operations of 8×8 matrix multiplications.

(Case of Two Parallel Operations of 8×8×8 Matrix Multiplications)

Figure 12:
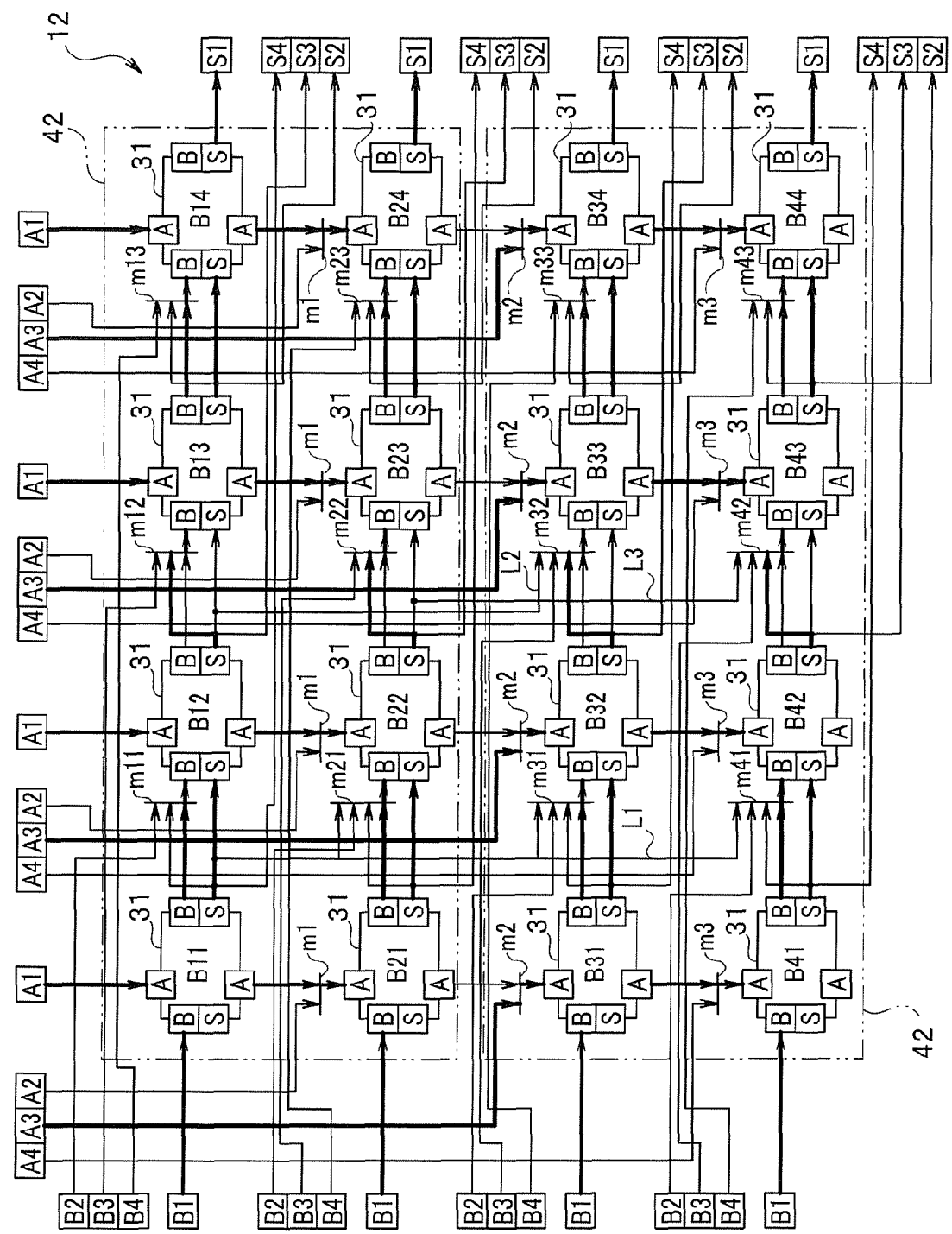
FIG. 12 is a diagram for illustrating a case of performing two parallel operations of 8×8×8 matrix multiplications according to the present embodiment.

Next, a case of operating two 8×8×8 matrix multiplications in parallel using the array 12 will be described. FIG. 12 is a diagram for illustrating a case of performing two parallel operations of 8×8×8 matrix multiplications. More specifically, FIG. 12 is a diagram for illustrating a case of operating matrix multiplications B×A of matrices B1 and B2 having 8 rows and n columns (n is a positive integer) and matrices A1 and A2 having n rows and 8 columns using the array 12 and operating two kinds of matrix multiplications of operation results thereof and matrices C1 and C2 having 8 rows and 8 columns at the same time to acquire matrices S1 and S2, which are operation results. In FIG. 12, the control unit 4 performs setting for selection of input data to be outputted by the respective multiplexers m1 to m3, and m11 to m43 so that inputs or outputs indicated by thick lines are selected.

In the blocks B21 to B24 and the blocks B41 to B44, the group of outputs A of an upper adjoining block is selected as the group of inputs A. For example, the group of outputs A of the block B11 is selected for the group of inputs A of the block B21.

In the blocks B31 to B34, the group of outputs A3 of the array 12 is selected as the group of inputs A.

In the blocks B12 and B14, the blocks B22 and B24, the blocks B32 and B34 and the blocks B42 and B44, the group of outputs B and group of outputs S of a left adjoining block are selected as the group of inputs B and the group of inputs S, respectively. For example, the group of outputs B and group of outputs S of the block B11 are inputted to the group of inputs B and group of inputs S of the block B12, respectively.

In the blocks B13, the block B23, the block B33 and the block B43, the group of outputs S of a left adjoining block is selected as the group of inputs B. For example, the group of outputs S of the block B12 is inputted to the group of inputs B of the block B13.

When the array 12 is configured as described above, and respective columns of the matrices A1 and C1, respective columns of the matrices A2 and C2 and respective rows of the matrices B1 and B2 are sequentially inputted to the group of inputs A1, the group of inputs A3 and the group of inputs B1, respectively, respective rows of the matrices S1 and S2 are sequentially outputted to the group of outputs S1.

That is, in FIG. 12, each of two block groups 42 indicated by two-dot chain lines performs an 8×8×8 matrix operation, and the array 12 can execute two parallel operations of 8×8×8 matrix multiplications.

(Case of Two-Branch Operation of 8×8×8 Matrix Multiplication)

Next, a case of performing a two-branch operation of an 8×8×8 matrix multiplication using the array 12 will be described.

Figure 13:
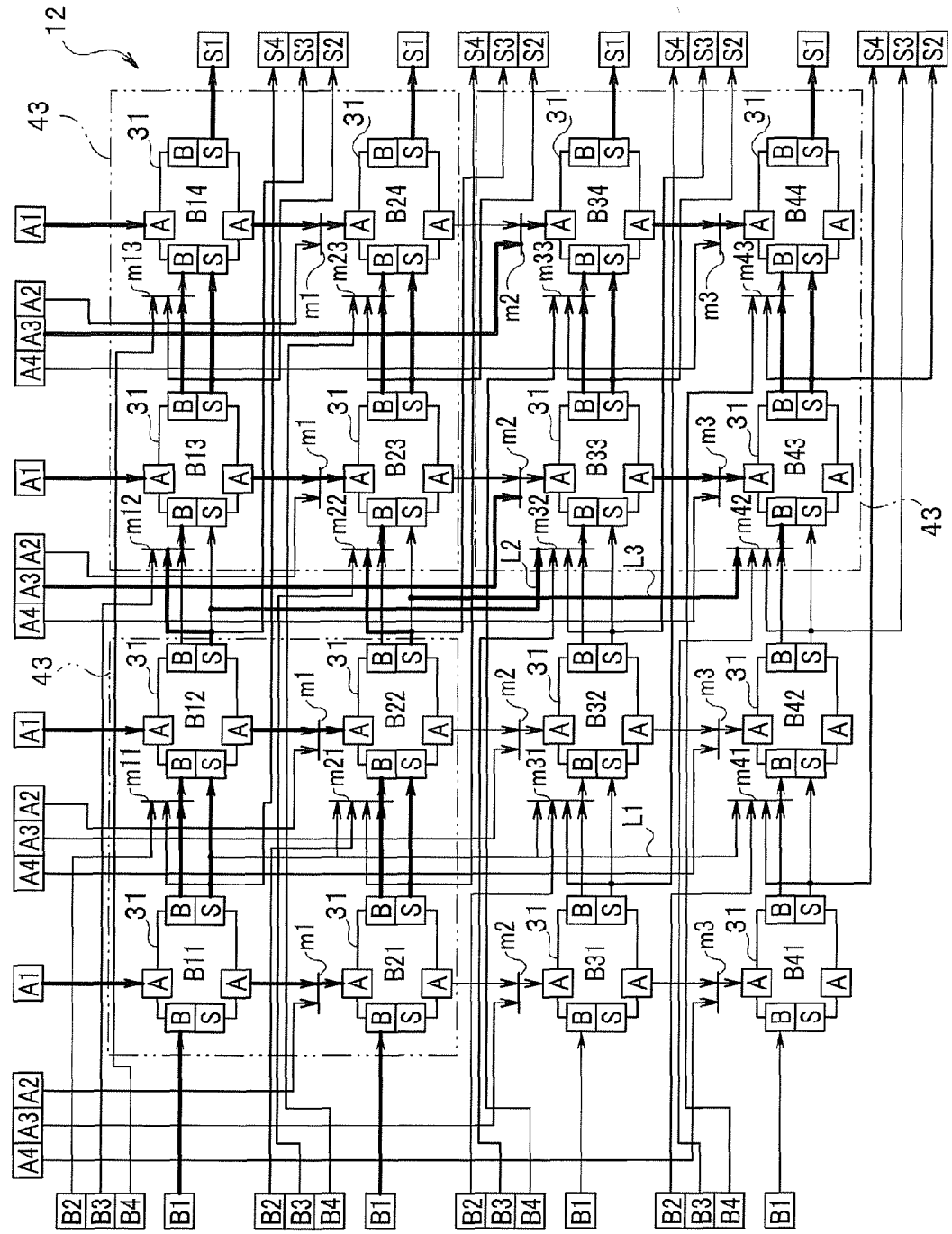
FIG. 13 is a diagram for illustrating a case of performing a two-branch operation of an 8×8×8 matrix multiplication according to the present embodiment.

FIG. 13 is a diagram for illustrating a case of performing the two-branch operation of an 8×8×8 matrix multiplication. More specifically, FIG. 13 is a diagram for illustrating a case of operating a matrix multiplication B×A of a matrix B having 8 rows and n columns (n is a positive integer) and a matrix A having n rows and 8 columns using the array 12 and operating two kinds of matrix multiplications of an operation result thereof and matrices C1 and C2 having 8 rows and 8 columns at the same time to acquire matrices S1 and S2, which are operation results. In FIG. 13, the control unit 4 performs setting for selection of input data to be outputted by the respective multiplexers m1 to m3, and m11 to m43 so that inputs or outputs indicated by thick lines are selected.

In the blocks B21 to B24 and the blocks B43 and B44, the group of outputs A of an upper adjoining block is selected as the group of inputs A. For example, the group of outputs A of the block B11 is inputted to the group of inputs A of the block B21.

In the blocks B33 to B34, the group of inputs A3 of the array is selected as the group of inputs A.

In the blocks B12 and B14, the blocks B22 and B24, the blocks B34 and the block B44, the group of outputs B and group of outputs S of a left adjoining block are selected as the group of inputs B and the group of inputs S, respectively. For example, the group of outputs B and group of outputs S of the block B 11 are inputted to the group of inputs B and group of inputs S of the block B12, respectively.

In the block B13 and the block B23, the group of outputs S of a left adjoining block is inputted as the group of inputs B. For example, the group of outputs S of the block B12 is inputted to the group of inputs B of the block B13.

In the blocks B33 and the block B43, the group of outputs S of a left and two blocks upper block is selected as the group of inputs B. For example, the group of outputs S of the block B12 is inputted to the group of inputs B of the block B33.

When the array 12 is configured as described above, and respective columns of the matrices A and C1, respective columns of the matrix C2 and respective rows of the matrix B are sequentially inputted to the group of inputs A1, a right half of the group of inputs A2, the group of inputs B1, respectively, respective rows of the matrices S1 and S2 are sequentially outputted to the group of outputs S1.

That is, in FIG. 13, each of three block groups 43 indicated by two-dot chain lines performs an 8×8 matrix operation, and the array 12 can execute a two-branch operation of an 8×8×8 matrix multiplication.

(Case of Sixteen Parallel Operations of 4×4 Matrix Multiplications)

Next, a case of performing sixteen parallel operations of 4×4 matrices using the array 12 will be described.

Figure 14:
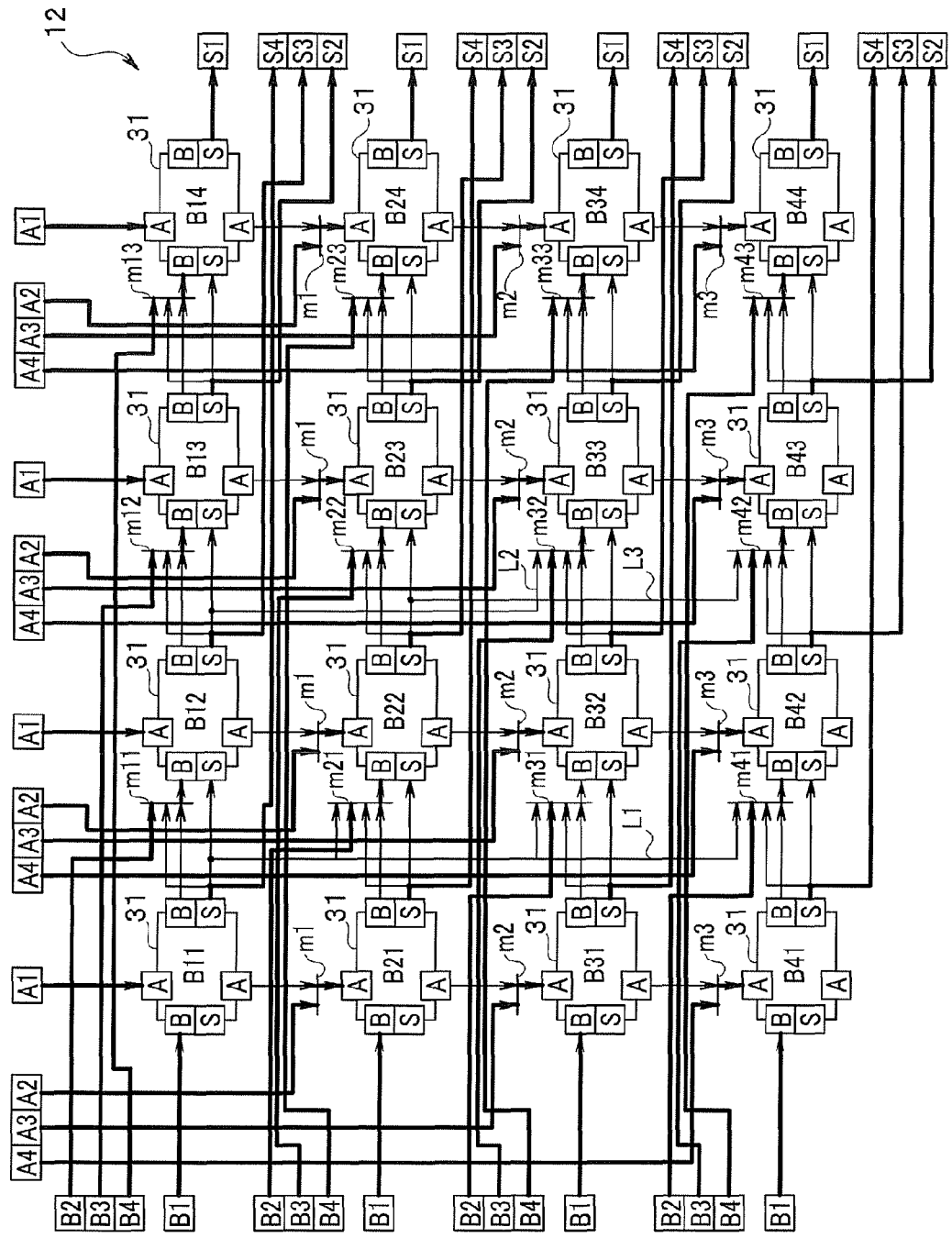
FIG. 14 is a diagram for illustrating a case of performing sixteen parallel operations of 4×4 matrix multiplications according to the present embodiment.

FIG. 14 is a diagram for illustrating the case of performing sixteen parallel operations of 4×4 matrices. More specifically, FIG. 14 is a diagram for illustrating a case of operating sixteen kinds of matrix multiplications B×A of matrices B1 to B16 having 4 rows and n columns (n is a positive integer) and matrices A1 to A16 having n rows and 4 columns using the array 12 to acquire matrices S1 to S 16, which are operation results. In FIG. 14, the control unit 4 performs setting of selection of input data to be outputted by the respective multiplexers m1 to m3, and m11 to m43 so that inputs or outputs indicated by thick lines are selected.

In the blocks B21 to B24, in the blocks B31 to B34 and in the blocks B41 to B44, the group of inputs A2 of the array 12, the group of inputs A3 of the array 12 and the group of inputs A4 of the array 12 are selected, respectively, as the group of inputs A.

In the blocks B12, B22, B32 and B42, in the blocks B13, B23, B33 and B43, and in the blocks B14, B24, B34 and B44, the group of inputs B2 of the array 12, the group of inputs B3 of the array 12 and the group of inputs B4 of the array 12 are selected, respectively, as the group of inputs B.

When the array 12 is configured as described above, and each column of the matrices A1 to A4, each column of the matrices A5 to A8, each column of the matrices A9 to A12, each column of the matrices A13 to A16, each row of the matrices B1 to B4, each row of the matrices B5 to B8, each row of the matrices B9 to B12, each row of the matrices B13 to B16 are sequentially inputted to the group of inputs A1, the group of inputs A2, the group of inputs A3, the group of inputs A4, the group of inputs B1, the group of inputs B2, the group of inputs B3 and the group of inputs B4, respectively, respective rows of matrices S1 to S4, respective rows of matrices S5 to S8, respective rows of matrices S9 to S12 and respective rows of matrices S13 to S16 are sequentially outputted to the group of outputs S4, the group of outputs S3, the group of outputs S2 and the group of outputs S1, respectively.

That is, in FIG. 14, each group of blocks 31 performs a 4×4 matrix operation, and the array 12 can perform sixteen operations of 4×4 matrix multiplications in parallel.

(Case of Four Parallel Operations of 4×4×4×4×4 Matrix Multiplications)

Next, a case of performing four parallel operations of 4×4×4×4×4 matrix multiplications using the array 12 will be described.

Figure 15:
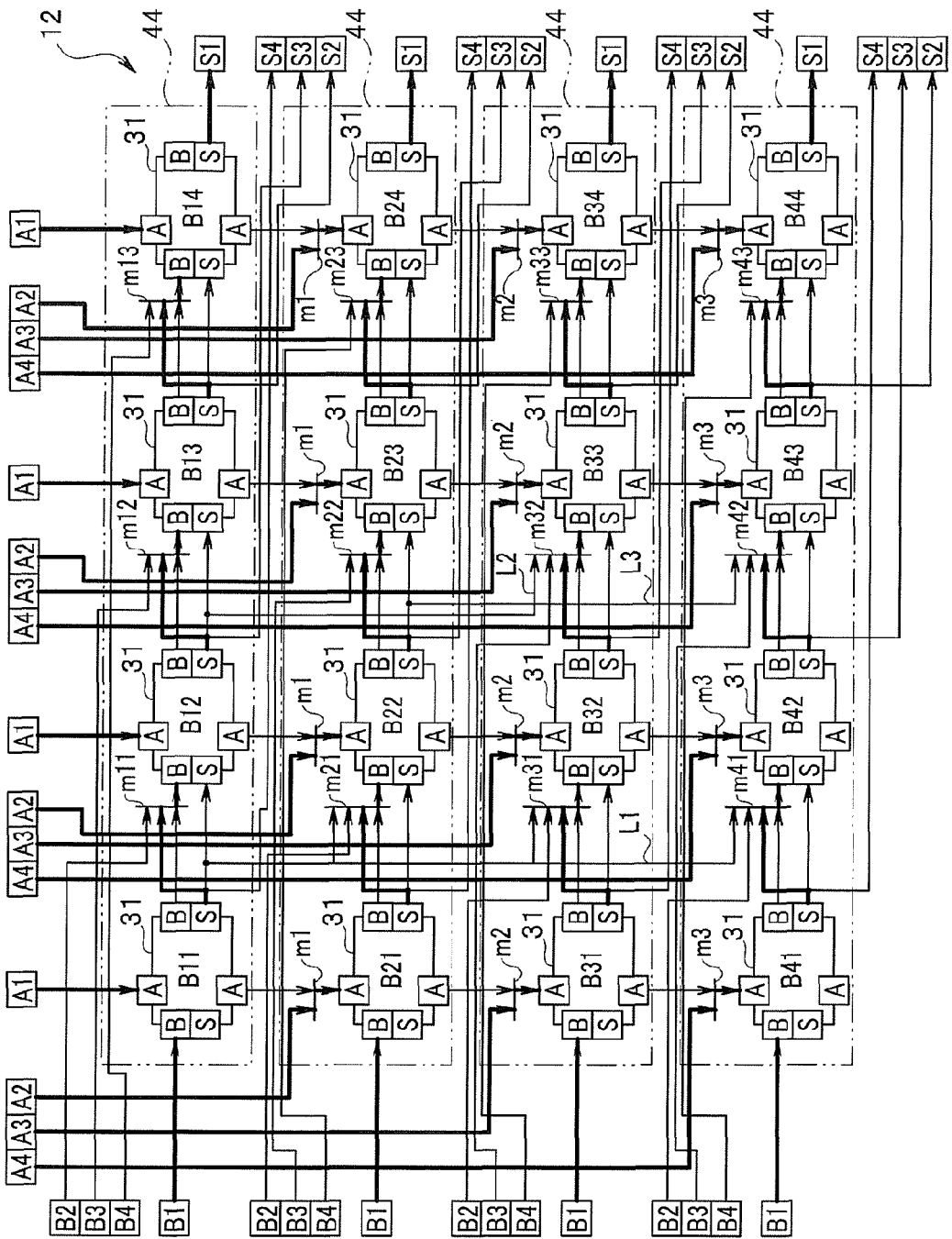
FIG. 15 is a diagram for illustrating a case of performing four parallel operations of 4×4×4×4×4 matrix multiplications according to the present embodiment.

FIG. 15 is a diagram for illustrating a case of performing four parallel operations of 4×4×4×4×4 matrix multiplications. More specifically, FIG. 15 is a diagram for illustrating a case of operating matrix multiplications B×A of matrices B1 to B4 having 4 rows and n columns (n is a positive integer) and matrices A1 to A4 having n rows and 4 columns using the array 12, operating matrix multiplications of operation results thereof and matrices C1 to C4 having 4 rows and 4 columns, further operating matrix multiplications of operation results thereof and matrices D1 to D4 having 4 rows and 4 columns and further operating matrix multiplications of operation results thereof and matrices E1 to E4 having 4 rows and 4 columns while operating the four kinds of matrix multiplications at the same time to acquire matrices S1 to S4, which are operation results. In FIG. 15, the control unit 4 performs setting for selection of input data to be outputted by the respective multiplexers m1 to m3, and m11 to m43 so that inputs or outputs indicated by thick lines are selected.

In the blocks B21 to B24, in the blocks B31 to B34 and in the blocks B41 to B44, the group of inputs A2 of the array 12, the group of inputs A3 of the array 12 and the group of inputs A4 of the array 12 are selected, respectively, as the group of inputs A.

In the blocks B12 to B14, the blocks B22 to B24, the blocks B32 to B34 and the blocks B42 to B44, the group of outputs S of a left adjoining block is selected, respectively, as the group of inputs B. For example, the group of outputs S of the block B11 is inputted to the group of inputs B of the block B12.

When the array 12 is configured as described above, and respective columns of the matrices A1, C1, D1 and E1, respective columns of the matrices A2, C2, D2 and E2, respective columns of the matrices A3, C3, D3 and E3, respective columns of the matrices A4, C4, D4 and E4 and respective rows of the matrices B1 to B4 are sequentially inputted to the group of inputs A1, the group of inputs A2, the group of inputs A3, the group of inputs A4 and the group of inputs B1, respectively, respective rows of the matrices S1 to S4 are sequentially outputted to the group of outputs S1.

That is, in FIG. 15, each of three block groups 44 indicated by two-dot chain lines performs a4×4×4×4×4 matrix operation, and the array 12 can execute four parallel operations of 4×4×4×4×4 matrix multiplications.

(Case of 4-System Operations of 4×4×12 Matrix Multiplications)

Next, a case of performing four parallel operations of 4×4×12 matrix multiplications using the array 12 will be described.

Figure 16:
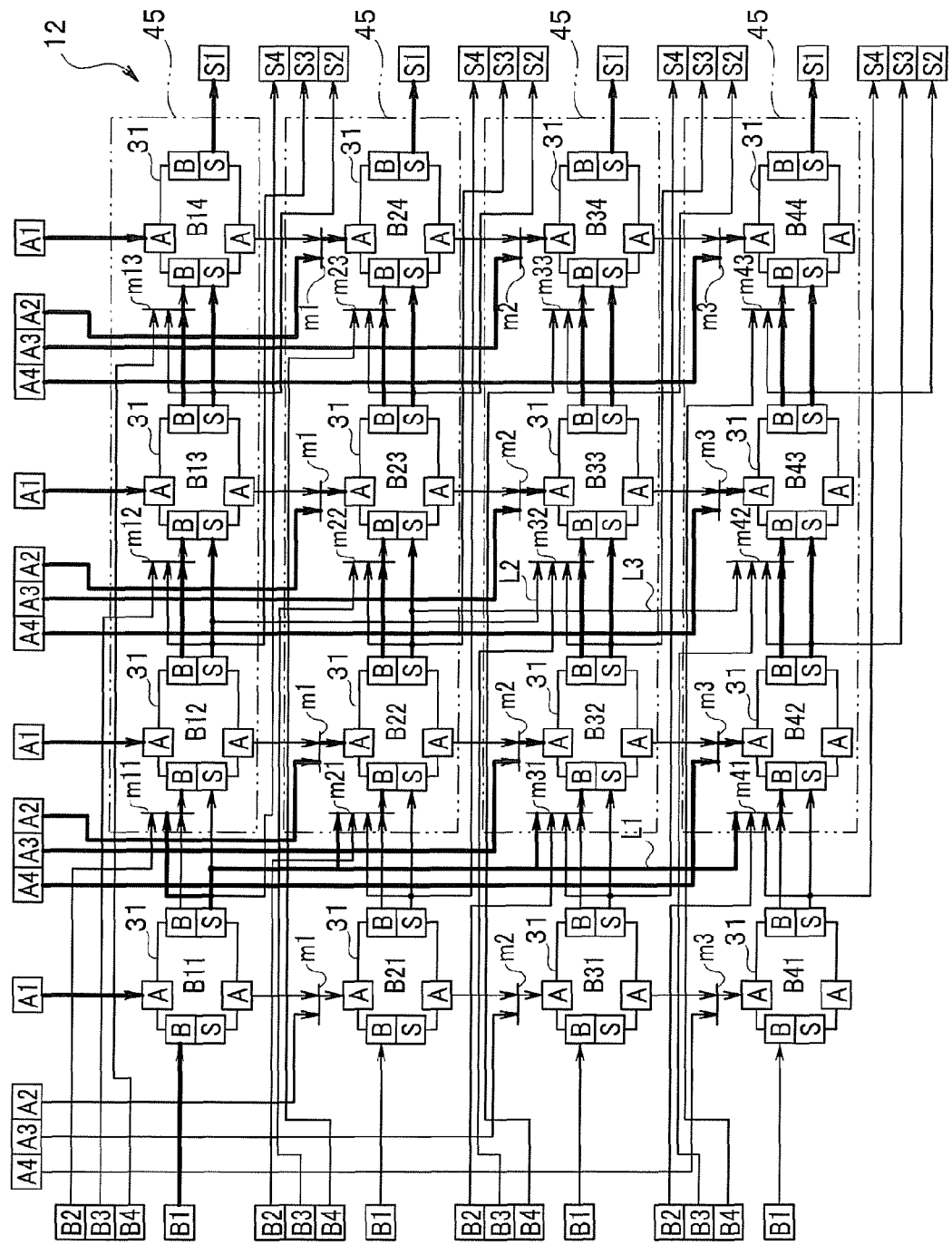
FIG. 16 is a diagram for illustrating a case of performing four parallel operations of 4×4×12 matrix multiplications according to the present embodiment.

FIG. 16 is a diagram for illustrating the case of performing four parallel operations of 4×4×12 matrix multiplications. More specifically, FIG. 16 is a diagram for illustrating a case of operating a matrix multiplication B×A of a matrix B having 4 rows and n columns (n is a positive integer) and a matrix A having n rows and 4 columns using the array 12 and operating four kinds of matrix multiplications of an operation result thereof and matrices C1 and C4 having 4 rows and 12 columns at the same time to acquire matrices S1 to S4, which are operation results. In FIG. 16, for the group of inputs A of the blocks B22 to B24, for the group of inputs A of the blocks B32 to B34 and for the group of inputs A of the blocks B42 to B44, the group of inputs A2 of the array 12, the group of inputs A3 of the array 12 and the group of inputs A4 of the array 12 are selected, respectively.

In the blocks B13 and B14, the blocks B23 and B24, the blocks B33 and B34 and the blocks B43 and B44, the group of outputs B and group of outputs S of a left adjoining block are selected as the group of inputs B and the group of inputs S, respectively. For example, the group of outputs B and group of outputs S of the block B12 are selected for the group of inputs B and group of inputs S of the block B13, respectively.

In the blocks B12, the block B22, the block B32 and the block B42, the group of outputs S of the block B11 is selected as the group of inputs B.

When the array 12 is configured as described above, and respective columns of the matrices A and C1, respective columns of the matrix C2, respective columns of the matrix C3, respective columns of the matrix C4 and respective rows of the matrix B are sequentially inputted to the group of inputs A1, the group of inputs A2, the group of inputs A3, the group of inputs A4 and the group of inputs B1, respectively, respective rows of the matrices S1 to S4 are sequentially outputted to the group of outputs S1.

That is, in FIG. 16, each of four block groups 45 indicated by two-dot chain lines performs a 4×12 matrix operation, and the array 12 can execute four parallel operations of 4×4×12 matrix multiplications.

As described above, according to the matrix operation system 1 of the present embodiment described above, it is possible to execute matrix operations in various forms with a small amount of data transfer without increasing the circuit scale. Furthermore, according to the matrix operation system 1 of the present embodiment, it is possible to execute various matrix operations.

A conventional systolic array is a system in which same circuits are regularly arranged to perform pipeline processing and parallel processing, and a configurable array processor is a processor having multiple nodes and multiple switch units for changing connection among the nodes.

In the case of the systolic array, however, because the systolic array is configured so that an operation for an input is executed through a predetermined number of cycles and an operation result of each cycle is immediately used in a next cycle, there is a problem that an amount of data transfer until a desired matrix operation result is obtained is large.

In comparison, in the matrix operation apparatus of the present embodiment, since each node has an accumulator in addition to an operation unit, the amount of data transfer in the whole matrix operation apparatus is small.

As for the configurable array processor, there is a problem that, since switch circuits for switching a wiring network are required among the nodes, the whole circuit scale increases.

In comparison, in the matrix operation apparatus of the embodiment described above, the circuit scale of the whole apparatus is small because such switch circuits do not exist.

Especially, there are merits that the amount of data transfer is small because each node 21 has the accumulator 29, and that the circuit scale does not increase because selection of an input to each block 31 is performed by selection control of each multiplexer by the control unit 4.

Furthermore, it is possible to perform processing of adding other data to a matrix operation result because the data management unit 3 has an addition function.

While certain embodiments have been described, these embodiments have been presented by way of example only, and are not intended to limit the scope of the inventions. Indeed, the novel devices described herein may be embodied in a variety of other forms; furthermore, various omissions, substitutions and changes in the form of the devices described herein may be made without departing from the spirit of the inventions. The accompanying claims and their equivalents are intended to cover such forms or modifications as would fall within the scope and spirit of the inventions.

What is claimed is:

1. A matrix operation apparatus executing a matrix operation, the apparatus comprising multiple nodes, the nodes each including: a first operation unit configured to perform a first operation for a first input which is column data and a second input which is row data for the matrix operation and output element components of an operation result of the matrix operation; and an accumulator configured to perform cumulative addition of operation results of the first operation unit,
   wherein each of the multiple nodes includes: a first input terminal configured to receive the column data of one of two matrices targeted by the matrix operation; a second input terminal configured to receive the row data of the other of the two matrices; a first output terminal configured to output the column data received; and a second output terminal configured to output the row data received.

2. The matrix operation apparatus according to claim 1, wherein each of the multiple nodes includes a third output terminal configured to output a cumulative addition result of the accumulator.

3. The matrix operation apparatus according to claim 2, wherein a subsequent-stage node, among the multiple nodes, includes a third input terminal for receiving an operation result of a prior-stage node.

4. The matrix operation apparatus according to claim 3, wherein
   the subsequent node includes a first selection circuit configured to select and output any of an input of the third input terminal and a cumulative addition result of the accumulator; and
   the third output terminal outputs the cumulative addition result of the accumulator via the first selection circuit.

5. The matrix operation apparatus according to claim 1, wherein
   a subsequent-stage node, among the multiple nodes, includes a first selection circuit configured to select and output any of an input of the second input terminal and a cumulative addition result of the accumulator; and
   the second output terminal outputs the cumulative addition result of the accumulator via the first selection circuit.

6. The matrix operation apparatus according to claim 5, comprising a control unit configured to control execution of a cumulative addition operation of the accumulator.

7. The matrix operation apparatus according to claim 6, wherein the control unit controls selection of the first selection circuit.

8. The matrix operation apparatus according to claim 1, wherein
   there are multiple blocks including the multiple nodes;
   the multiple blocks include a prior-stage block and a subsequent-stage block; and
   in the subsequent-stage block, the row data is inputted to the second input terminals of the multiple nodes via a first selection circuit configured to select and output any of a cumulative addition result of the accumulator of each node included in the prior-stage block and an input from other than the prior-stage block.

9. The matrix operation apparatus according to claim 8, wherein
   the multiple blocks are connected in a matrix shape; and
   the cumulative addition result inputted to the first selection circuit is a cumulative addition result of the accumulator of each node included in a prior-stage block on a same row of the matrix.

10. The matrix operation apparatus according to claim 9, wherein the cumulative addition result inputted to the first selection circuit is a cumulative addition result of the accumulator of each node included in a prior-stage block on a different column of the matrix.

11. The matrix operation apparatus according to claim 8, comprising:
    a second operation unit configured to perform a second operation for the column data and the row data for the matrix operation and outputs of the multiple blocks; and
    a second selection circuit configured to select and output any of the outputs of the multiple blocks and an output of the second operation unit.

12. The matrix operation apparatus according to claim 11, comprising a control unit configured to control execution of a cumulative addition operation of the accumulator and to control selection of the first selection circuit and the second selection circuit.

13. The matrix operation apparatus according to claim 8, wherein each of the multiple nodes includes a third output terminal configured to output a cumulative addition result of the accumulator.

14. The matrix operation apparatus according to claim 13, wherein a subsequent-stage node, among the multiple nodes, includes a third input terminal for receiving an operation result of a prior-stage node.

15. The matrix operation apparatus according to claim 14, wherein
    the subsequent node includes a second selection circuit configured to select and output any of an input of the third input terminal and a cumulative addition result of the accumulator; and
    the third output terminal outputs the cumulative addition result of the accumulator via the second selection circuit.

16. The matrix operation apparatus according to claim 8, wherein the first operation unit is a multiplier.

17. The matrix operation apparatus according to claim 8, comprising a control unit configured to control execution of a cumulative addition operation of the accumulator.

18. The matrix operation apparatus according to claim 1, wherein the first operation unit is a multiplier.

* * * * *